(12) United States Patent
Murashita et al.

(10) Patent No.: US 7,979,357 B2
(45) Date of Patent: Jul. 12, 2011

(54) ELECTRONIC COMMERCE METHOD, ELECTRONIC COMMERCE SYSTEM, CERTIFICATE TERMINAL, AND PRINCIPAL CERTIFICATION METHOD BY AGENT

(75) Inventors: Kimitaka Murashita, Kawasaki (JP); Takashi Shinzaki, Kawasaki (JP); Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/491,023

(22) Filed: Jun. 24, 2009

(65) Prior Publication Data
US 2009/0259593 A1    Oct. 15, 2009

Related U.S. Application Data

(60) Division of application No. 11/131,426, filed on May 18, 2005, now abandoned, which is a continuation of application No. PCT/JP03/04271, filed on Apr. 3, 2003.

(51) Int. Cl.
*G06Q 99/00*  (2006.01)

(52) U.S. Cl. ............... 705/76; 705/50; 705/64; 705/65; 705/67; 705/75; 713/186; 726/2; 726/17; 726/21; 380/255; 380/277

(58) Field of Classification Search ............. 705/50–79; 713/186; 726/2, 17, 21; 380/255, 277
See application file for complete search history.

(56) References Cited

U.S. PATENT DOCUMENTS

| | | | |
|---|---|---|---|
| 6,317,834 B1 * | 11/2001 | Gennaro et al. | 713/186 |
| 6,933,832 B1 * | 8/2005 | Simms et al. | 340/5.73 |
| 7,039,813 B2 * | 5/2006 | Algazi et al. | 713/186 |
| 2001/0032096 A1 * | 10/2001 | Uchida | 705/1 |
| 2002/0004752 A1 * | 1/2002 | Kuma | 705/23 |
| 2003/0159052 A1 | 8/2003 | Lee et al. | 713/186 |
| 2006/0010077 A1 * | 1/2006 | Dohrmann et al. | 705/65 |

FOREIGN PATENT DOCUMENTS

| | | |
|---|---|---|
| JP | 2001-297269 | 10/2001 |
| JP | 2002-109439 | 4/2002 |

(Continued)

OTHER PUBLICATIONS

Liu et al., "A Practical Guide to Biometric Security Technology", Jan./Feb. 2001, IEEE, vol. 3 Issue I, pp. 27-32.*

(Continued)

*Primary Examiner* — Jalatee Worjloh
(74) *Attorney, Agent, or Firm* — Staas & Halsey LLP

(57) ABSTRACT

In order to prevent without fail the abuse of certificate information which are exchanged on a network, an orderer inputs the certificate information to a certificate terminal when placing an order for a commodity, the certificate terminal encrypts the certificate information to send it to an order receiver and holds the certificate information and a decryption key. A deliveryman, at the time of commodity delivery, inputs the encrypted certificate information to the certificate terminal, and the orderer inputs data of terminal certification to the certificate terminal. The certificate terminal, when it certifies by the data that the orderer is the valid owner of the certificate terminal, decrypts the encrypted certificate information input by the deliveryman, by the decryption key in the certificate terminal, verifies decrypted certificate information with the certificate information in the certificate terminal, and the deliveryman hands over the commodity to the orderer when the certificate information match.

4 Claims, 16 Drawing Sheets

FOREIGN PATENT DOCUMENTS

JP    2003-50952    2/2003

OTHER PUBLICATIONS

Office Action mailed from the U.S. Patent and Trademark Office on Dec. 11, 2006 in related U.S. Appl. No. 11/131,426.
Office Action mailed from the U.S. Patent and Trademark Office on Jan. 29, 2007 in related U.S. Appl. No. 11/131,426.
Office Action mailed from the U.S. Patent and Trademark Office on Aug. 23, 2007 in related U.S. Appl. No. 11/131,426.
Office Action mailed from the U.S. Patent and Trademark Office on Feb. 12, 2008 in related U.S. Appl. No. 11/131,426.
Office Action mailed from the U.S. Patent and Trademark Office on Jul. 17, 2008 in related U.S. Appl. No. 11/131,426.
Office Action mailed from the U.S. Patent and Trademark Office on Feb. 25, 2009 in related U.S. Appl. No. 11/131,426.
U.S. Appl. No. 11/131,426, filed May 18, 2005, Kimitaka Murashita, et al. Fujitsu Limited.

* cited by examiner

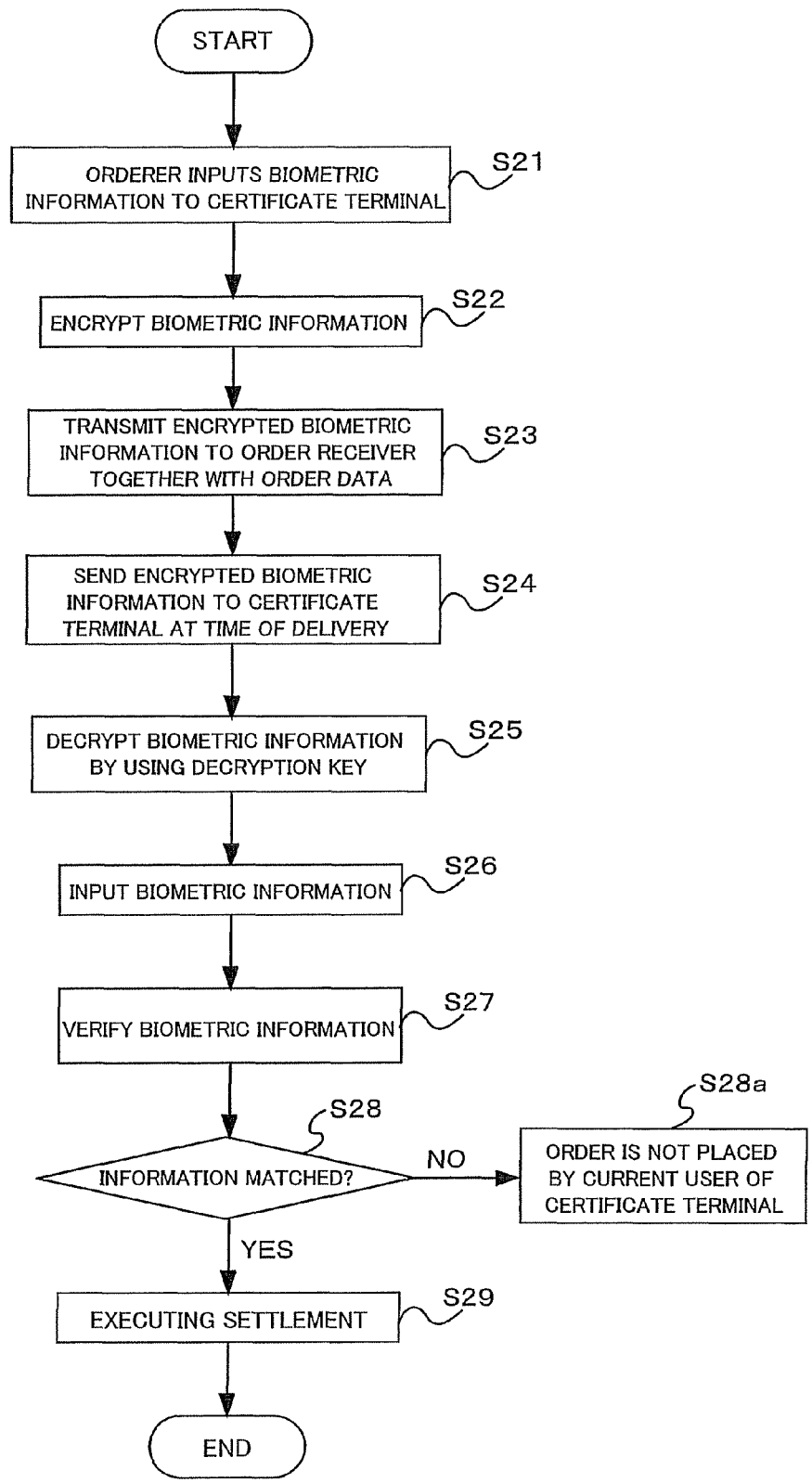

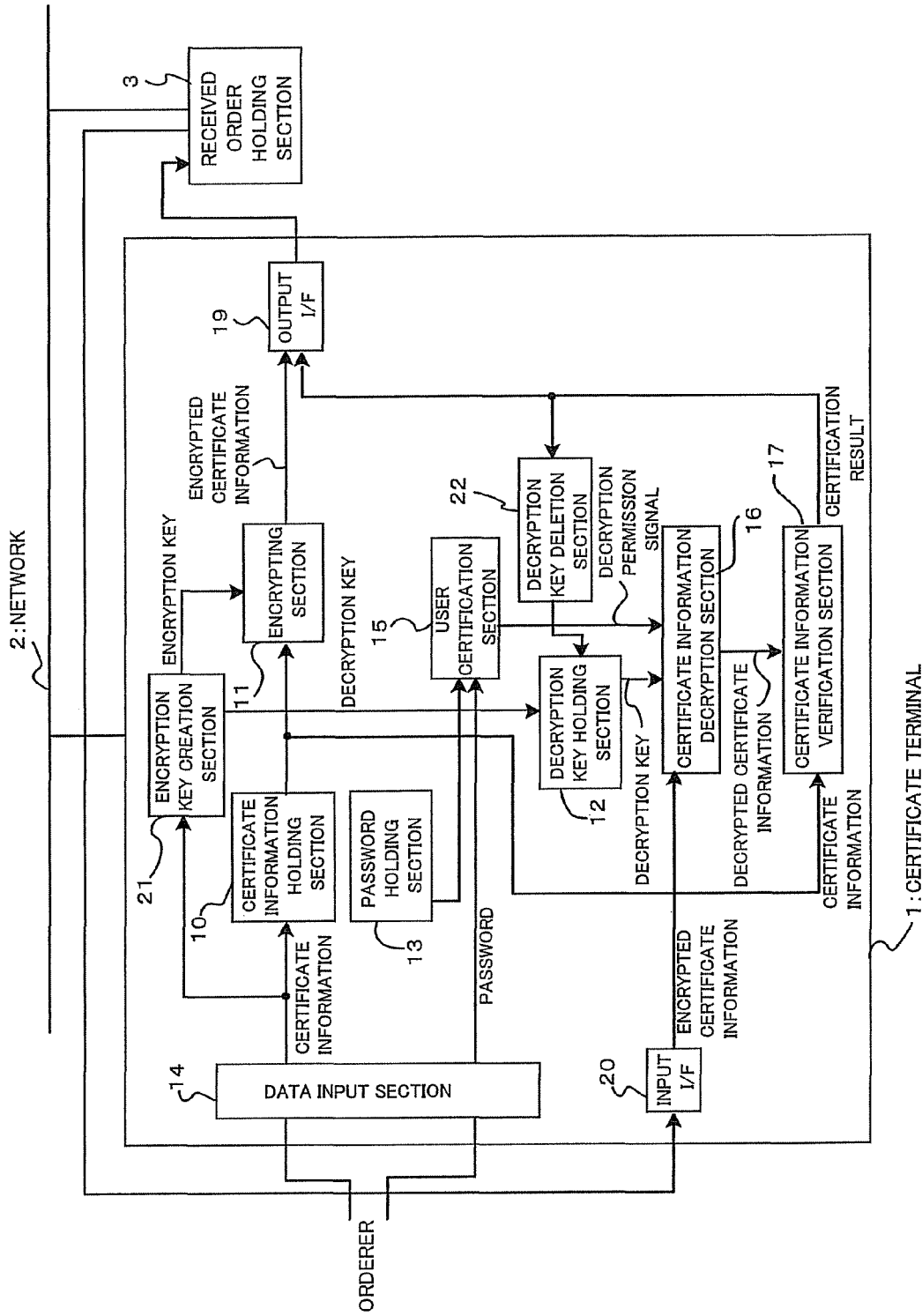

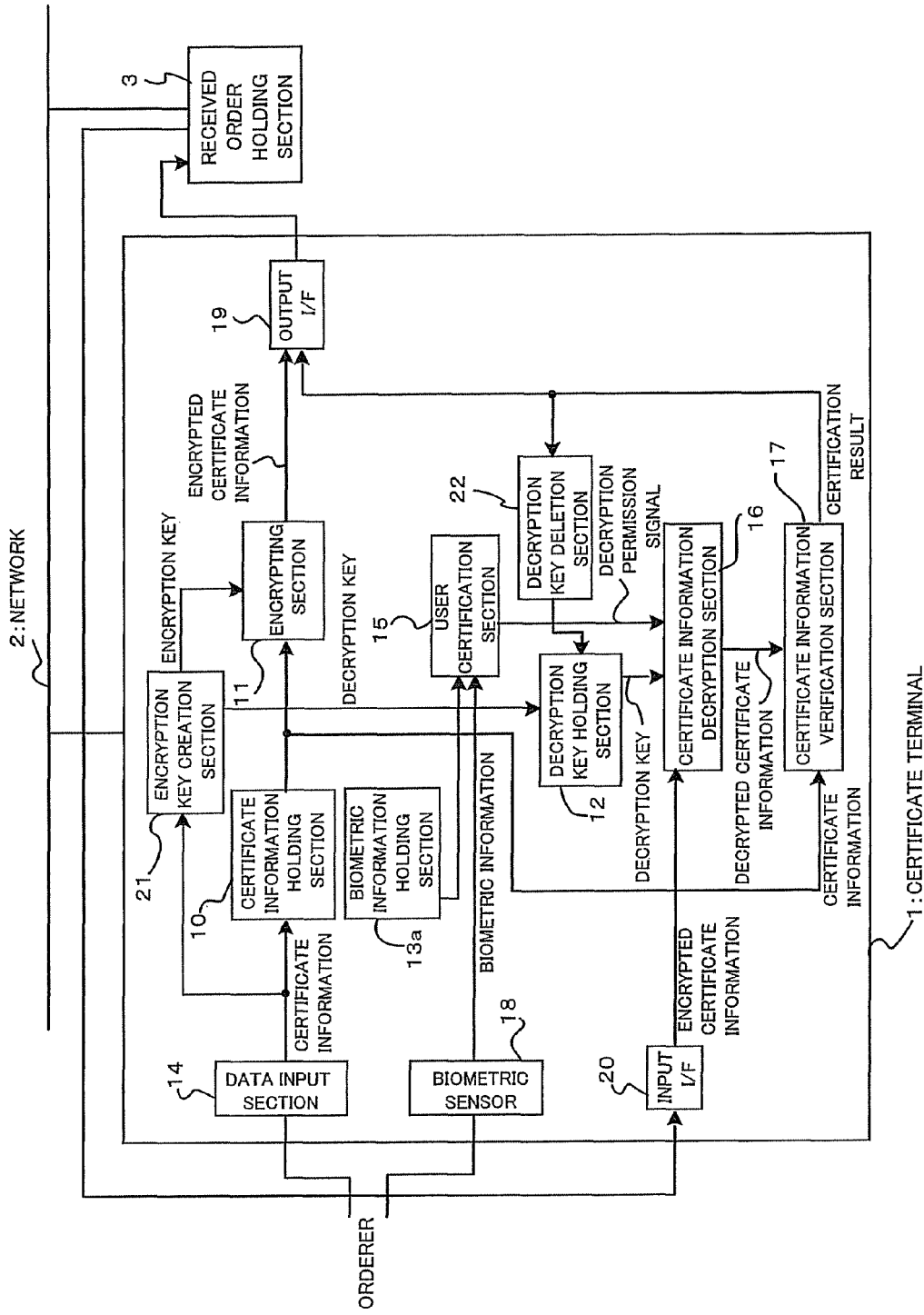

The present invention relates to technology used in electronic commerce where principal certification is performed by using principal certificate information such as a password or digital data (biometric information) representing physical features of a principal.

ELECTRONIC COMMERCE METHOD, ELECTRONIC COMMERCE SYSTEM, CERTIFICATE TERMINAL, AND PRINCIPAL CERTIFICATION METHOD BY AGENT

CROSS-REFERENCE TO RELATED APPLICATIONS

This application is a divisional of application Ser. No. 11/131,426, filed May 18, 2005, now abandoned, which is a continuing application, filed under 35 U.S.C. §111(a), of International Application PCT/JP2003/004271, filed Apr. 3, 2003, the contents of which are incorporated herein by reference in their entireties.

BACKGROUND OF THE INVENTION

1. Field of the Invention

The present invention relates to technology used in electronic commerce where principal certification is performed by using principal certificate information such as a password or digital data (biometric information) representing physical features of a principal.

2. Description of the Related Art

There exists PKI (Public Key Infrastructure) as a method of certifying a principal in electronic commerce. In PKI, a certificate authority (hereinafter, referred to as CA) issues a secret key and a public key to a registered user. The user, when placing an order for a commodity or the like with a dealer, encrypts the electronics signature of the user by the secret key and sends it to the dealer with the public key. The dealer confirms that the transmitted electronic signature can be decrypted by the public key, and verifies the user with CA based on the public key to certify that the sender is the user himself/herself. PKI guarantees that information of the user transmitted on a network has not been falsified and a third person has not impersonated the user.

In PKI, security on network paths is ensured by using a public key encryption method. However, if the third person steals the secret key of the user and uses it, PKI cannot determine whether it is a valid user or unauthorized use by the third person. Therefore, a principal certificate that can surely prove that the principal uses the secret key is required in addition to PKI. With a "word" such as the password, it is only possible to confirm that one knows it and is impossible to determine that the user is a principal or another person.

Consequently, verification by biometric information has been proposed as an alternative certification method to the password. The biometric information is the physical features of the user, which are transformed into data, and typical biometric information is fingerprint, palm pattern, retina, iris, sign, voice or the like. By verifying the biometric information previously registered with the biometric information that the user input, it is possible to confirm that a person who has just input the biometric information is the user himself/herself.

A method disclosed in Japanese Patent Laid-open No. 2001-297269 (Patent Document 1) is known as the principal certification means using biometrics data. In this method, an orderer (user) sends his/her biometric information from an ordering terminal to an electronic commerce server of a dealer (order receiver) when an order is placed for the commodity. Then, the electronic commerce server sends the biometric information of the orderer to an identification terminal (verifying terminal) arranged in a store that the orderer specified as a receiving store. After that, when a recipient requests to hand over a commodity, a store clerk obtains the biometric information of the recipient using the identification terminal and verifies it with the biometric information of the orderer, which has been sent from electronic commerce server. Then, the store clerk hands over the commodity when the biometric information match.

However, in such electronic commerce, biometric information must be passed to the dealer and there is a danger that the biometric information will run out by mistake. If the biometric information runs out, there is a possibility that the third person will abuse it to perform unauthorized order or unauthorized transaction by impersonation.

Further, certification is performed by using the biometric information in the above-described electronic commerce, only the orderer himself/herself can receive the commodity, and there has not been receiving means when an agent tries to receive the commodity if the orderer cannot receive it.

The present invention has been created in view of such problems. Its first object is to prevent without fail the abuse of certificate information such as the password and biometric information, which is exchanged on the network when performing electronic commerce, and the second object is to enable not only an orderer himself/herself but also an agent specified by the orderer himself/herself to receive a commodity or the like.

SUMMARY OF THE INVENTION

To achieve the above-described object, the electronic commerce method (1) of the present invention is a method in which an orderer places an order for a commodity with an order receiver via a network and receives the commodity, where (1-1) the orderer inputs certificate information for identifying the orderer himself/herself to a certificate terminal when placing an order for the commodity, (1-2) the certificate terminal encrypts the certificate information by a predetermined encryption key, sends encrypted certificate information to the order receiver together with an order form of the commodity via the network, and holds the certificate information and a decryption key for decrypting the encrypted certificate information, (1-3) a person in charge of delivery of the order receiver, when delivering the commodity, inputs the encrypted certificate information received from the certificate terminal when placing an order for the commodity, and the orderer inputs terminal certification data showing that he/she is the valid owner of the certificate terminal to the certificate terminal, (1-4) the certificate terminal, after certifying by the data that the orderer is the valid owner of the certificate terminal, decodes the encrypted certificate information, which has been input by the person in charge of delivery, by the decryption key held in the certificate terminal, verifies decrypted certificate information with the certificate information held in certificate terminal, and, when the certificate information match, notifies it to the orderer, the person in charge of delivery, and the order receiver, and (1-5) the person in charge of delivery executes handing over of the commodity to the orderer on receiving verification-matched notification from the certificate terminal.

An electronic commerce method (2) of the present invention is a method in which an orderer places an order for a commodity with an order receiver via a network and receives the commodity, where (2-1) the orderer inputs first orderer biometric information for identifying the orderer himself/herself to a certificate terminal when placing an order for the commodity, (2-2) the certificate terminal encrypts the first orderer biometric information by a predetermined encryption key, sends encrypted first orderer biometric information to the order receiver together with an order form via the network, and holds a decryption key for decrypting the encrypted first orderer biometric information, (2-3) a person in charge of delivery of the order receiver, when delivering the commodity, inputs the encrypted first orderer biometric information received from the certificate terminal when the order was placed for the commodity, and the orderer inputs second orderer biometric information for identifying the orderer himself/herself to the certificate terminal, (2-4) the certificate terminal decrypts the encrypted first orderer biometric information, which has been input by the person in charge of delivery, by the decryption key held in the certificate terminal, verifies the decrypted first orderer biometric information with the second biometric information, and, when the orderer biometric information match, notifies it to the orderer, the person in charge of delivery, and the order receiver, and (2-5) the person in charge of delivery executes handing over of the commodity to the orderer on receiving verification-matched notification from the certificate terminal.

An electronic commerce method (3) of the present invention is a method in which an orderer places an order for a commodity with an order receiver via a network and an agent entrusted by the orderer receives the commodity, where (3-1) the orderer inputs first orderer biometric information for identifying the orderer himself/herself to a certificate terminal when placing an order for the commodity, (3-2) the certificate terminal sends the first orderer biometric information to the order receiver together with the order form of the commodity via the network, (3-3) when the orderer entrusts the agent to receive the commodity, the orderer inputs a second orderer biometric information for identifying the orderer himself/herself to the certificate terminal, and the agent inputs first agent biometric information for identifying the agent himself/herself to the certificate terminal, (3-4) the certificate terminal holds the second orderer biometric information and the first agent biometric information in a coordinated manner, (3-5) a person in charge of delivery of the order receiver, when delivering the commodity, inputs the first orderer biometric information received from the certificate terminal when the order was placed for the commodity to the certificate terminal, and the agent inputs second agent biometric information for identifying the agent himself/herself to the certificate terminal, (3-6) the certificate terminal verifies the second agent biometric information with the first agent biometric information held in the certificate terminal, verifies the first orderer biometric information input by the person in charge of delivery with the second orderer biometric information held in the certificate terminal when the agent biometric information match, and, when the orderer biometric information match, notifies it to the agent, the person in charge of delivery, and the order receiver, and (3-7) the person in charge of delivery executes handing over of the commodity to the agent on receiving verification-matched notification from the certificate terminal.

An electronic commerce method (4) of the present invention is a method of loaning money as a commodity between a loanee being an orderer and a financial institution being an order receiver via a network, where (4-1) the orderer inputs certificate information for identifying the orderer himself/herself to the certificate terminal at the point of money consumption loan agreement between the orderer and the order receiver, (4-2) the certificate terminal encrypts the certificate information by a predetermined encryption key, sends encrypted certificate information to the order receiver via the network, and holds the certificate information and a decryption key for decrypting the encrypted certificate information, (4-3) when the orderer pays back the money to the order receiver, the order receiver inputs the encrypted certificate information, which has been received from the certificate terminal at the point of money consumption loan agreement, to the certificate terminal, and the orderer inputs data necessary for decrypting the encrypted certificate information to the certificate terminal, and (4-4) the certificate terminal decrypts the encrypted certificate information, which has been input by the order receiver, by the decryption key held in the certificate terminal according to the data, verifies decrypted certificate information with the certificate information held in the certificate terminal, and stores the verification result in the certificate terminal.

An electronic commerce method (5) of the present invention is a method of loaning money as a commodity between a loanee being an orderer and a financial institution being an order receiver via a network, where (5-1) the orderer inputs first orderer biometric information for identifying the orderer himself/herself to the certificate terminal at the point of money consumption loan agreement between the orderer and the order receiver, (5-2) the certificate terminal encrypts the first orderer biometric information by a predetermined encryption key, sends encrypted first orderer biometric information to the order receiver via the network, and holds a decryption key for decrypting the encrypted first orderer biometric information, (5-3) when the orderer pays back the money to the order receiver, the order receiver inputs the encrypted first orderer biometric information, which has been received from the certificate terminal at the point of money consumption loan agreement, to the certificate terminal, and the orderer inputs second orderer biometric information for identifying the orderer himself/herself to the certificate terminal, and (5-4) the certificate terminal decrypts the encrypted first orderer biometric information, which has been input by the order receiver, by the decryption key held in the certificate terminal, verifies decrypted first orderer biometric information with the second biometric information, and stores the verification result in the certificate terminal.

An electronic commerce method (6) of the present invention is a method in which a remitter requests a financial institution to remit money from a remitter's account to a recipient by a remitter's terminal via a network, where (6-1) the recipient inputs certificate information for identifying the recipient himself/herself to a recipient's certificate terminal, (6-2) the certificate terminal encrypts the certificate information by a predetermined encryption key, sends encrypted certificate information to a remitter's terminal via the network, and holds the certificate information and a decryption key for decrypting the encrypted certificate information, (6-3) the remitter's terminal sends the encrypted certificate information from the certificate terminal to the financial institution via the network together with a remittance request, (6-4) when the recipient receives the money from the remitter, a person in charge of remittance of the financial institution inputs the encrypted certificate information received from the remitter's terminal to the certificate terminal, and the recipient inputs data necessary for decrypting the encrypted certificate information to the certificate terminal, (6-5) the certificate terminal decrypts the encrypted certificate information, which has been input by the person in charge of remittance, by the decryption key held in the certificate terminal according to the data, verifies decrypted certificate information with the certificate information held in the certificate terminal, and, when the certificate information match, notifies it to the recipient and the person in charge of remittance, and (6-6) the person in charge of remittance hands over the money from the remitter to the recipient on receiving verification-matched notification from the certificate terminal.

An electronic commerce method (7) of the present invention is a method in which a remitter requests a financial institution to remit money from a remitter's account to a recipient by a remitter's terminal via a network, where (7-1) the recipient inputs first recipient biometric information for identifying the recipient himself/herself to a recipient's certificate terminal, (7-2) the certificate terminal encrypts the first recipient biometric information by a predetermined encryption key, sends encrypted first recipient biometric information to a remitter's terminal via the network, and holds a decryption key for decrypting the encrypted first recipient biometric information, (7-3) the remitter's terminal sends the encrypted first recipient biometric information from the certificate terminal to the financial institution via the network together with a remittance request, (7-4) when the recipient receives the money from the remitter, a person in charge of remittance of the financial institution inputs the encrypted first recipient biometric information received from the remitter's terminal to the certificate terminal, and the recipient inputs second recipient biometric information for identifying the recipient himself/herself to the certificate terminal, (7-5) the certificate terminal decrypts the encrypted first recipient biometric information, which has been input by the person in charge of remittance, by the decryption key held in the certificate terminal, verifies decrypted first recipient biometric information with the second biometric information, and, when the biometric information match, notifies it to the recipient and the person in charge of remittance, and (7-6) the person in charge of remittance hands over the money from the remitter to the recipient on receiving verification-matched notification from the certificate terminal.

An electronic commerce method (8) of the present invention is a method in which a remitter requests a financial institution to remit money from a remitter's account to a recipient by a recipient's certificate terminal via a network, where (8-1) the recipient inputs certificate information for identifying the recipient himself/herself to a recipient's certificate terminal, (8-2) the certificate terminal encrypts the certificate information by a predetermined encryption key, sends encrypted certificate information and remittance request to the financial institution via the network, and holds the certificate information and a decryption key for decrypting the encrypted certificate information, (8-3) when the recipient receives the money from the remitter, a person in charge of remittance of the financial institution inputs the encrypted certificate information received from the certificate terminal to the certificate terminal, and the recipient inputs data necessary for decrypting the encrypted certificate information to the certificate terminal, (8-4) the certificate terminal decrypts the encrypted certificate information, which has been input by the person in charge of remittance, by the decryption key held in the certificate terminal according to the data, verifies decrypted certificate information with the certificate information held in the certificate terminal, and, when the certificate information match, notifies it to the recipient and the person in charge of remittance, and (8-5) the person in charge of remittance hands over the money from the remitter to the recipient on receiving verification-matched notification from the certificate terminal.

An electronic commerce method (9) of the present invention is a method in which a remitter requests a financial institution to remit money from a remitter's account to a recipient by a recipient's certificate terminal via a network, where (9-1) the recipient inputs first recipient biometric information for identifying the recipient himself/herself to a recipient's certificate terminal, (9-2) the certificate terminal encrypts the first recipient biometric information by a predetermined encryption key, sends encrypted first recipient biometric information and remittance request to the financial institution via the network, and holds a decryption key for decrypting the encrypted first recipient biometric information, (9-3) when the recipient receives the money from the remitter, a person in charge of remittance of the financial institution inputs the encrypted first recipient biometric information received from the certificate terminal to the certificate terminal, and the recipient inputs second recipient biometric information for identifying the recipient himself/herself to the certificate terminal, (9-4) the certificate terminal decrypts the encrypted first recipient biometric information, which has been input by the person in charge of remittance, by the decryption key held in the certificate terminal, verifies decrypted first recipient biometric information with the second biometric information, and, when the biometric information match, notifies it to the recipient and the person in charge of remittance, and (9-5) the person in charge of remittance hands over the money from the remitter to the recipient on receiving verification-matched notification from the certificate terminal.

An electronic commerce system (10) of the present invention is constituted by including: a certificate terminal of an orderer, which places an order for a commodity with an order receiver and performs certification to the orderer himself/herself at the time of receiving the commodity; a network via which information is exchanged between the certificate terminal and the order receiver; and a received order information holding section of the order receiver, which holds received order information sent from the certificate terminal via the network, where the certificate terminal is made up of a certificate information input section which inputs certificate information for identifying the orderer himself/herself when an order is placed for the commodity, an encrypting section that encrypts the certificate information input from the certificate information input section by a predetermined encryption key, an output interface section that sends encrypted certificate information, which has been encrypted by the encrypting section, as the received order information to the order receiver via the network together with an order form, a certificate information holding section that holds the certificate information input from the certificate information input section, a decryption key holding section that holds a decryption key for decrypting the encrypted certificate information encrypted by the encrypting section, a data holding section that previously holds data certifying that he/she is the valid owner of the certificate terminal, which is necessary for decrypting the encrypted certificate information, a data input section which inputs the data by the orderer at the time of commodity delivery, an input interface section that inputs the encrypted certificate information held in the received order information holding section at the time of commodity delivery, an orderer certification section that verifies data held in the data holding section with data input from the data input section and permits the use of the decryption key held in the decryption key holding section when the data match, a decryption section that decrypts the encrypted certificate information, which has been input from the input interface section, by using the decryption key on receiving verification result by the orderer certification section, and a verification section that verifies certificate information decrypted by the decryption section with certificate information held in the certificate information holding section and notifies the verification result to the orderer, a person in charge of delivery of the commodity, and the order receiver.

An electronic commerce system (11) of the present invention is constituted by including: a certificate terminal of an orderer, which places an order for a commodity with an order receiver and performs certification to the orderer himself/ herself at the time of receiving the commodity; a network on which information is exchanged between the certificate terminal and the order receiver; and a received order information holding section of the order receiver, which holds received order information sent from the certificate terminal via the network, where the certificate terminal is made up of a biometric information input section which inputs the biometric information of the orderer after it is obtained, an encrypting section that encrypts first orderer biometric information, which the orderer has input from the biometric information input section when placing an order for the commodity, by a predetermined encryption key, an output interface section that sends encrypted first orderer biometric information, which has been encrypted by the encrypting section, as the received order information to the order receiver via the network together with an order form, a decryption key holding section that holds a decryption key for decrypting the encrypted first biometric information encrypted by the encrypting section, an input interface section that inputs the encrypted first biometric information held in the received order information holding section at the time of commodity delivery, a decryption section that decrypts the encrypted first orderer biometric information, which has been input from the input interface section, by using the decryption key held in the decryption key holding section, and a verification section that verifies first biometric information decrypted by the decryption section with second orderer biometric information, which has been input from the biometric information input section by the orderer when placing an order for the commodity, and notifies the verification result to the orderer, the person in charge of delivery of the commodity and the order receiver.

An electronic commerce system (12) of the present invention is constituted by including: a certificate terminal of an orderer, which places an order for a commodity with an order receiver and performs certification when an agent entrusted by the orderer receives the commodity; a network on which information is exchanged between the certificate terminal and the order receiver; and a received order information holding section of the order receiver, which holds received order information sent from the certificate terminal via the network, where the certificate terminal is made up of a biometric information input section which inputs the biometric information of the orderer after it is obtained, an encrypting section that encrypts first orderer biometric information, which the orderer has input from the biometric information input section when placing an order for the commodity, by a predetermined encryption key, an output interface section that sends encrypted first orderer biometric information, which has been encrypted by the encrypting section, as the received order information to the order receiver via the network together with an order form, a decryption key holding section that holds a decryption key for decrypting the encrypted first biometric information encrypted by the encrypting section, an orderer biometric information holding section that holds second orderer biometric information that the orderer has input from the biometric information input section when the orderer entrusts the agent with receiving of the commodity, an agent biometric information holding section that holds first agent biometric information that the agent has input from the biometric information input section when the orderer entrusts the agent with receiving of the commodity, an input interface section that inputs the encrypted first orderer biometric information held in the received order information holding section at the time of commodity delivery, an agent certification section that verifies the first agent biometric information held in the agent biometric information holding section with second agent biometric information, which the agent has input from the biometric information input section at the time of commodity delivery and permits the use of the decryption key held in the decryption key holding section when the agent biometric information match, a decryption section that decrypts the encrypted first orderer biometric information, which has been input from the input interface section, by using the decryption key on receiving the verification result by the agent certification section, and an orderer certification section that verifies first orderer biometric information decrypted by the decryption section with second orderer biometric information held in the orderer biometric information holding section and notifies the verification result to the orderer, the person in charge of delivery of the commodity and the order receiver.

A certificate terminal (13) of the present invention is one by which an orderer places an order for a commodity with an order receiver via a network and performs certification when the orderer himself/herself receives the commodity, which corresponds to the certificate terminal in the above-described electronic commerce system (10).

A certificate terminal (14) of the present invention is one by which an orderer places an order for a commodity with an order receiver via a network and performs certification when the orderer himself/herself receives the commodity, which corresponds to the certificate terminal in the above-described electronic commerce system (11).

A certificate terminal (15) of the present invention is one by which an orderer places an order for a commodity with an order receiver via a network and performs certification when an agent entrusted by the orderer receives the commodity, which corresponds to the certificate terminal in the above-described electronic commerce system (12).

A principal certification method by an agent (16) of the present invention is a method in which an agent entrusted by a certified person performs principal certification to the certified person, where (16-1) the certified person inputs first certified person biometric information for identifying the certified person himself/herself to a certificate terminal, (16-2) the certificate terminal sends the first certified person biometric information to a dealer who needs the principal certification result of the certified person via a network, (16-3) when the certified person entrusts the agent, the certified person inputs second certified person biometric information for identifying the certified person himself/herself to the certificate terminal, and the agent inputs first agent biometric information for identifying the agent himself/herself to the certificate terminal, (16-4) the certificate terminal holds the second certified person biometric information and the first agent biometric information in a coordinated manner, (16-5) the first certified person biometric information sent to the dealer is input to the certificate terminal at the time of principal certification to the certified person, and the agent inputs second agent biometric information for identifying the agent himself/ herself to the certificate terminal, and (16-6) the certificate terminal verifies the second agent biometric information with the first agent biometric information held in the certificate terminal, and verifies the first certified person biometric information, which has been input, with the second certified person biometric information held in the certificate terminal when the agent biometric information match to perform principal certification to the certified person.

According to the above-described present invention, the certificate information or the biometric information of the orderer/recipient is encrypted and passed to the order receiver/financial institution at the time of placing an order for a commodity, or the like, the encrypted information is decrypted only by the certificate terminal of the orderer/ recipient. When the orderer/recipient receives the commodity or money, the person in charge of delivery/person in charge of remittance or the orderer/recipient inputs predetermined information including the above-described encrypted information to the certificate terminal, theabove-described encrypted information is decrypted in the certificate terminal, and principal certification to the orderer/recipient is performed. Therefore, this can surely prevent the certificate information such as passwords and biometric information, which is exchanged on the network when performing electronic commerce, from being abused.

Further, according to the present invention, the biometric information of the agent and the biometric information of the orderer are previously held in the certificate terminal, the person in charge of delivery (dealer) inputs the biometric information of the orderer, which has been sent from the certificate terminal, to the certificate terminal at the time of commodity delivery (at the principal certification to the orderer who is a certified person), the agent inputs his/her own biometric information to the certificate terminal, and when principal certification to the agent is performed first in the certificate terminal and the agent is certified to be the principal, principal certification to the orderer (certified person) is performed by the biometric information of the orderer, which has been input by the person in charge of delivery, and biometric information of the orderer, which is previously held in the certificate terminal. Accordingly, receiving of commodity or the like is made possible not only by the orderer himself/ herself but also by the agent specified by the orderer himself/ herself at the time of receiving the commodity while security is ensured, and convenience significantly improves.

According to the present invention, the following effects are obtained with regard to the orderer/recipient (user), the order receiver/financial institution (dealer), and a settlement institution respectively.

Regarding the orderer/recipient (user), the use of PKI (key management, executing encryption) can be simplified, and impersonating action by misappropriation of biometric information or unauthorized order is prevented without fail, and electronic commerce using the Internet or the like can be performed without fear. Further, principal certification to the orderer by the agent is made possible, and convenience significantly improves.

Regarding the order receiver/financial institution (dealer), unauthorized order can be detected and practice of the unauthorized order can be prevented, and thus illegal fraud of commodity by unauthorized transaction can be prevented without fail.

Regarding the settlement institution, unauthorized settlement can be detected, and practice of settlement, which is not intended by the orderer (user) user, can be prevented without fail.

BRIEF DESCRIPTION OF THE DRAWINGS

FIG. 5 is a flowchart for explaining the procedure of the third example of the electronic commerce method of the present invention.

FIG. 13 is a block diagram showing a first constitution example of the electronic commerce system and the certificate terminal of the present invention.

FIG. 14 is a block diagram showing a second constitution example of the electronic commerce system and the certificate terminal of the present invention.

DETAILED DESCRIPTION OF THE PREFERRED EMBODIMENTS

Figure 1A:
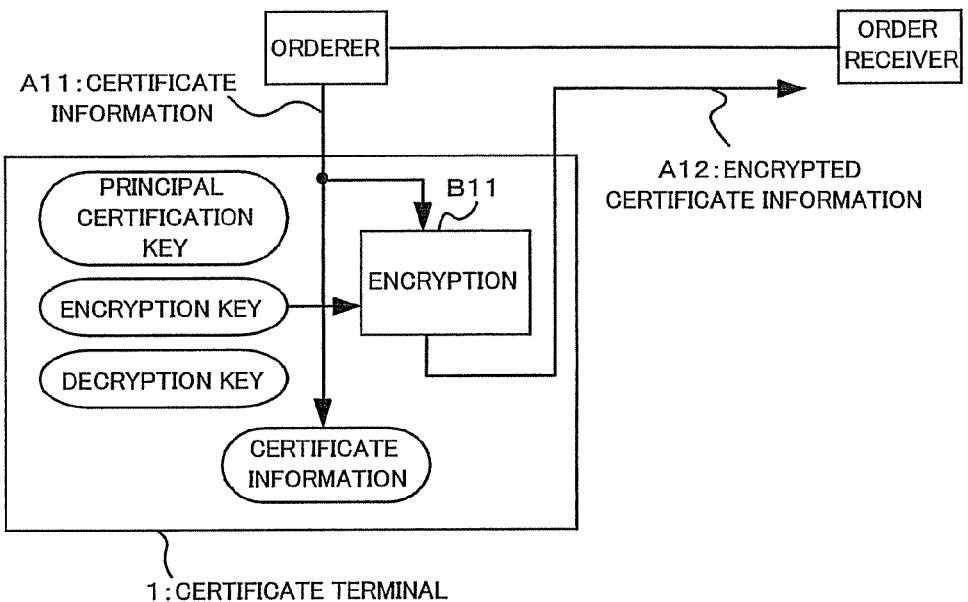
FIG. 1A and FIG. 1B are views for explaining a first example of the electronic commerce method of the present invention.

In the following, embodiments of the present invention will be described referring to the drawings.

(1) Electronic Commerce Method of the Present Invention (Principal Certification Method by an Agent)

Description will be made as follows for the fundamental procedure of the electronic commerce method of the present invention and the fundamental procedure of the electronic commerce method including the principal certification method of an agent of the present invention.

(1-1) First Example of the Electronic Commerce Method of the Present Invention

Figure 1B:
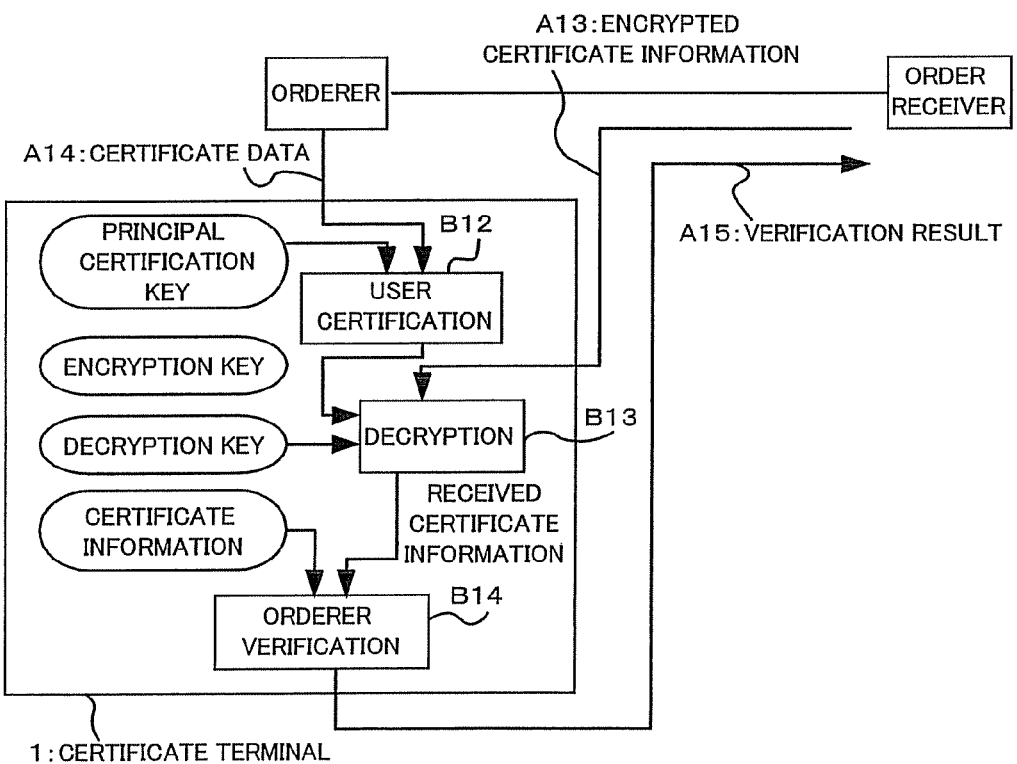
Figure 2:
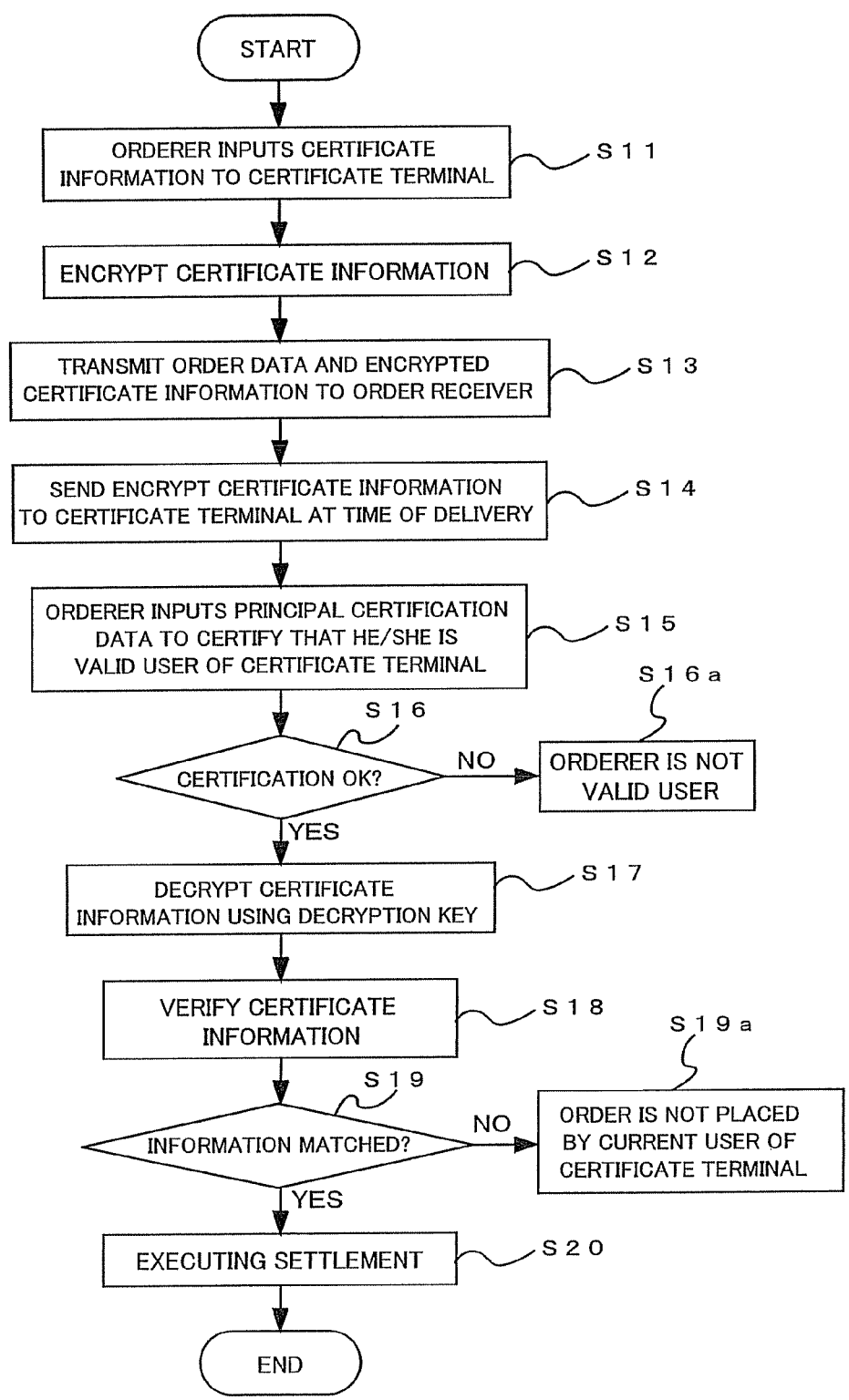
FIG. 2 is a flowchart for explaining the procedure of the first example of the electronic commerce method of the present invention.

FIG. 1A and FIG. 1B are views for explaining the first example of the electronic commerce method of the present invention, and FIG. 2 is the flowchart (step S11 to S20, S16a, S19a) for explaining the procedure of the first example of the electronic commerce method of the present invention. The first example of the electronic commerce method is a method in which an orderer places an order for a commodity with an order receiver via a network and the orderer himself/herself receives the commodity.

When placing an order for the commodity, the orderer inputs certificate information for identifying the orderer himself/herself to a certificate terminal 1 that the orderer owns, as shown in FIG. 1A (refer to arrow A11 and step S11). In the certificate terminal 1, the certificate information that has been input is encrypted by a predetermined encryption key held in the certificate terminal 1 (refer to block B11 and step S12), and the encrypted certificate information is sent to the order receiver together with the order form (received order data) of the commodity (refer to arrow A12 and step S13). At this point, the certificate information that has been input on step S11 and a decryption key for decrypting the encrypted certificate information that has been encrypted on step S12 are held in the certificate terminal 1. Note that a principal certification key (such as a password) for performing user certification (described later) at the time of commodity delivery is also previously held in the certificate terminal 1.

Next, when the order receiver delivers the commodity, a person in charge of delivery of the order receiver sends/inputs the encrypted certificate information received from the certificate terminal 1 when the order was placed for the commodity to the certificate terminal 1 that the orderer owns, as shown in FIG. 1B (refer to arrow A13 and step S14). The certificate terminal 1 is equipped with a slot (input interface section 20 of FIG. 13, for example) for medium such as Compact Flash® card. The person in charge of delivery brings the encrypted certificate information while it is stored in the medium such as Compact Flash, and inserts the medium into the slot to input the encrypted certificate information to the certificate terminal 1. The medium for transporting the encrypted certificate information to the certificate terminal 1 is not limited to Compact Flash, but may be various kinds of media such as PC card, IC card, Smart Media®, and Memory Stick®.

Further, the orderer inputs data necessary for decrypting the encrypted certificate information (principal certification data for performing user certification in this case) to the certificate terminal 1 (arrow A14). Then, the certificate terminal 1 verifies whether or not the principal certification data, which has been input as shown by arrow A14, matches a principal certification key previously held in the certificate terminal 1, and certifies that an orderer who is about to receive the commodity is the valid user of the certificate terminal 1 (refer to block B12 and step S15).

If the principal certification data and the principal certification key do not match and the orderer is certified as not being the valid user of the certificate terminal 1 (NO route of step S16), the certificate terminal 1 notifies it to the person in charge of delivery, the orderer, and the order receiver, and the person in charge of delivery ends the procedure without performing delivery (refer to step S16a). On the other hand, when the principal certification data and the principal certification key match and the orderer is certified as the valid user of the certificate terminal 1 (YES route of step S16), the certificate terminal 1 decrypts the encrypted certificate information, which has been input by the person in charge of delivery on step S14, by the decryption key held in the certificate terminal 1 (refer to block B13 and step S17), and furthermore, decrypted certificate information is verified with the certificate information held in the certificate terminal 1 when the order was placed (refer to block B14 and step S18).

If the certificate information do not match (NO route of step S19), the certificate terminal 1 recognizes that this order is not from the current user of the certificate terminal 1, notifies the verification result to the person in charge of delivery, the orderer, and the order receiver, and the person in charge of delivery ends the procedure without performing delivery (refer to arrow A15 and step S19a). On the other hand, when the certificate information match (YES route of step S19), the certificate terminal 1 notifies the verification result to the person in charge of delivery, the orderer, and the order receiver (refer to arrow A15), and the person in charge of delivery hands over the commodity to the orderer and the order receiver executes the settlement of this transaction (refer to step S20).

Note that the notification of certification/verification result on steps S16 and S19 to the person in charge of delivery and the orderer is performed by turning on LED (Light Emitting Diode) of the certificate terminal 1, for example.

In the first example of the electronic commerce method of the present invention, input and encryption of information are completed in the certificate terminal 1 that the user (orderer) owns. There is no occasion where decryption key for decrypting encrypted data (encrypted certificate information) is output to the outside of the certificate terminal 1, and the orderer himself/herself does not need to know what the decryption key is, so that a danger that a third person decrypts the encrypted certificate information can be reduced.

As described, according to the first example of the electronic commerce method of the present invention, certification that the recipient of commodity is the orderer himself/herself can be realized by using the certificate information (password, biometric information, for example), and information can be prevented from running out by performing all the processes in the certificate terminal 1 that the orderer owns.

Meanwhile, a method is possible that the certificate terminal is prepared in the order receiver and necessary information (certificate information, decryption key, principal certification key) is saved in a medium (IC card, for example) that the orderer owns, but the information needs to be handed over to the certificate terminal that the order receiver owns in such a method. If the order receiver is a dealer having a malicious intent, there is a danger that the information will be abused. Therefore, it is desirable that the information be held in the certificate terminal 1 that the orderer himself/herself owns and never be output to the outside.

Further, when the order was placed for the commodity, the certificate information input by the orderer was encrypted unconditionally in the above-described first example, but user certification is performed using the principal certification key and encryption may be executed when the order is certified to be the valid user of the certificate terminal 1, similar to the process performed at the time of commodity delivery. With this method, even if a third person other than the owner obtains the certificate terminal 1, he/she cannot execute encryption to the certificate information and the third person cannot use the certificate terminal 1.

(1-2) Second Example of the Electronic Commerce Method of the Present Invention

Figure 3:
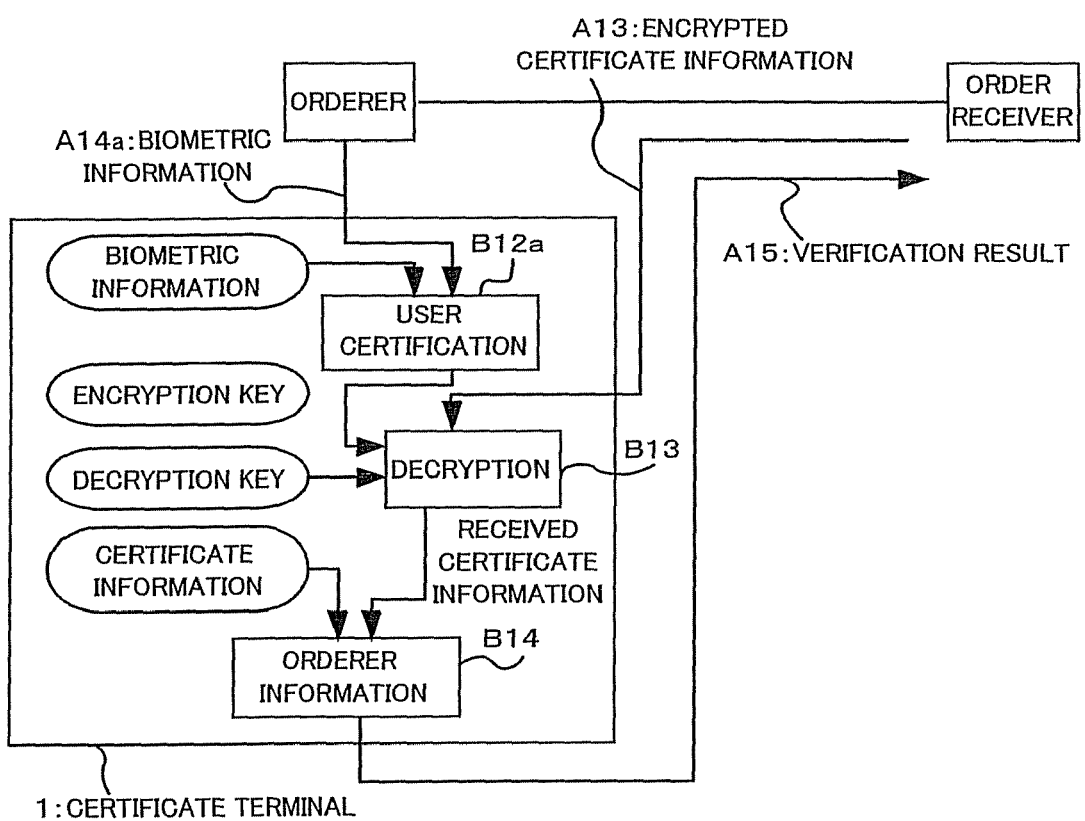
FIG. 3 is a view for explaining a second example of the electronic commerce method of the present invention.

FIG. 3 is the view for explaining the second example of the electronic commerce method of the present invention.

In the second example of the electronic commerce method of the present invention, the certificate terminal 1 previously holds the biometric information of the orderer himself/herself instead of the principal certification key of the above-described first example.

In the second example, the procedure at the time of placing an order is also substantially the same as the procedure of the above-described first example (refer to steps S11 to S14 of FIG. 1A and FIG. 2), but the orderer inputs his/her own biometric information (refer to arrow A14a) instead of the certification data of the first example when receiving the commodity as shown in FIG. 3. Then, the certificate terminal 1 verifies whether or not the biometric information that has been input as described above matches the biometric information previously held in the certificate terminal 1, and certifies that the orderer who is about to receive the commodity is the valid user of the certificate terminal 1 (refer to block B12a).

The procedure on and after this is the same as the above-described first example, and when the two biometric information match and the orderer is certified to be the valid user of the certificate terminal 1, the certificate terminal 1 decrypts (refer to block B13) the encrypted certificate information, which has been input by the person in charge of delivery (refer to arrow A13), by the decryption key held in the certificate terminal 1, and furthermore, verifies the decrypted certificate information with the certificate information held in the certificate terminal 1 when the order was placed (refer to block B14). Then, when the certificate information match, the certificate terminal 1 notifies the verification result to the person in charge of delivery, the orderer, and the order receiver (refer to arrow A15), and the person in charge of delivery hands over the commodity to the orderer and the order receiver executes the settlement of this transaction.

Accordingly, operational effect similar to the above-described first example can be obtained in the second example of the electronic commerce method of the present invention. However, user certification by the principal certification key is performed at the time of commodity delivery in the first example, but, when the principal certification key is a password, the third person may use the certificate terminal 1 if the third person has a chance to know the password. On the contrary, in the above-described second example, user certification in the certificate terminal 1 is performed not by the password but by the biometric information (fingerprint data, for example), by which only the owner of the certificate terminal 1 is allowed to use the certificate terminal 1, and it is possible to realize electronic commerce where higher security performance is ensured.

(1-3) Third Example of the Electronic Commerce Method of the Present Invention

Figure 4A:
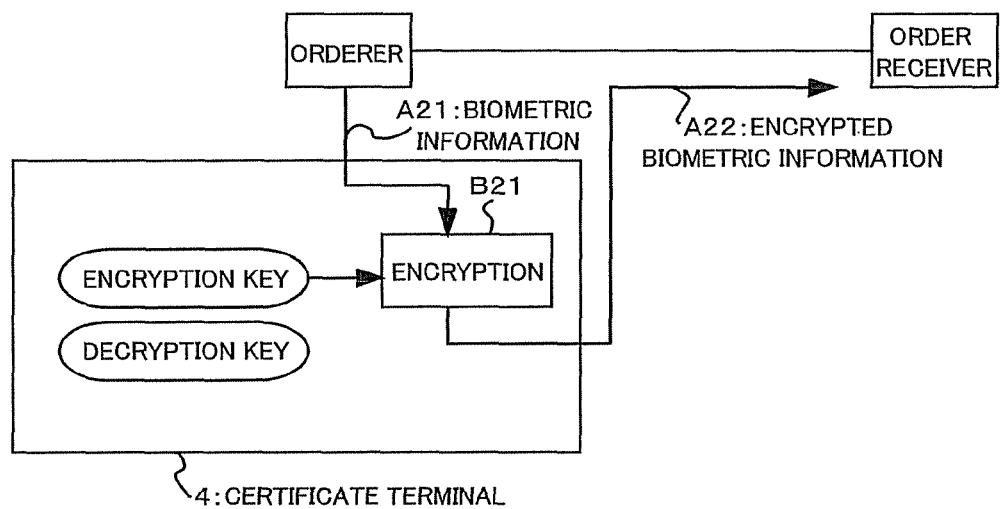
FIG. 4A and FIG. 4B are views for explaining a third example of the electronic commerce method of the present invention.
Figure 4B:
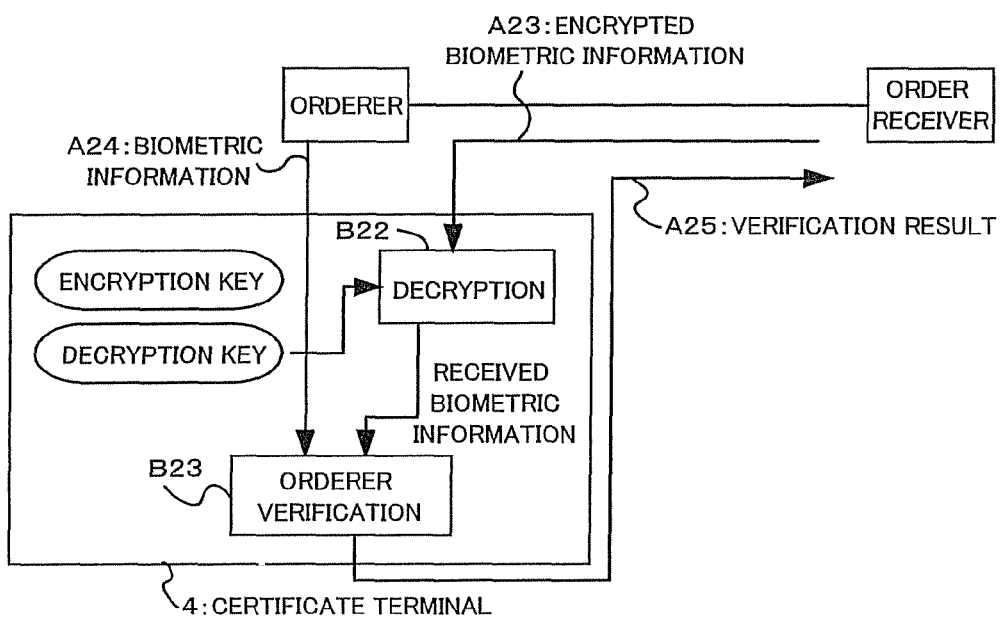

FIG. 4A and FIG. 4B are the views for explaining the third example of the electronic commerce method of the present invention, and FIG. 5 is the flowchart (steps S21 to S29, S28a) for explaining the procedure of the third example of the electronic commerce method of the present invention. The third example of the electronic commerce method is also a method where the orderer places an order for a commodity with the order receiver via the network and the orderer himself/herself receives the commodity.

When placing an order for the commodity, the orderer inputs the first orderer biometric information for identifying the orderer himself/herself to a certificate terminal 4 that the orderer owns, as shown in FIG. 4A (refer to arrow A21 and step S21). In the certificate terminal 4, the first orderer biometric information that has been input is encrypted by a predetermined encryption key held in the certificate terminal 4 (refer to block B21 and step S22), and the encrypted first orderer biometric information is sent to the order receiver together with the order form (received order data) of the commodity (refer to arrow A22 and step S23). At this point, a decryption key for decrypting the encrypted first orderer biometric information that has been encrypted on step S22 is held in the certificate terminal 4.

Next, when the order receiver delivers the commodity, the person in charge of delivery of the order receiver sends/inputs the encrypted first orderer biometric information received from the certificate terminal 4 when the order was placed for the commodity to the certificate terminal 4 that the orderer owns, as shown in FIG. 4B (refer to arrow A23 and step S24). The certificate terminal 4 is equipped with a slot (input interface section 46 of FIG. 15, for example) for medium such as Compact Flash® card. The person in charge of delivery brings the encrypted first orderer biometric information while it is stored in the medium such as Compact Flash, and inserts the medium into the slot to input the encrypted first orderer biometric information to the certificate terminal 4. The first orderer biometric information that has been input to the certificate terminal 4 is decrypted by the decryption key held in the certificate terminal 4 (refer to block B22 and step S25).

Further, the orderer inputs second orderer biometric information for identifying the orderer himself/herself again to the certificate terminal 4 at the time of commodity delivery (refer to arrow A24 and step S26). Note that the decryption timing on step S25 and the input timing on step S26 may be opposite.

After that, the certificate terminal 4 verifies the first orderer biometric information decrypted on step S25 with the second orderer biometric information that has been input to the certificate terminal 4 at the time of commodity delivery on step S26 (refer to block B23 and step S27).

If the orderer biometric information do not match (NO route of step S28), the certificate terminal 4 recognizes that this order is not from the current user of the certificate terminal 4, notifies the verification result to the person in charge of delivery, the orderer, and the order receiver, and the person in charge of delivery ends the procedure without performing delivery (refer to arrow A25 and step S28a). On the other hand, when the orderer biometric information match (YES route of step S28), the certificate terminal 4 notifies the verification result to the person in charge of delivery, the orderer, and the order receiver (refer to arrow A25), and the person in charge of delivery hands over the commodity to the orderer and the order receiver executes the settlement of this transaction (refer to step S29).

Note that the notification of certification/verification result on step S28 to the person in charge of delivery and the orderer is performed by turning on LED (Light Emitting Diode) of the certificate terminal 4 in the same manner as the above-described first example, for example.

As described, according to the third example of the electronic commerce method of the present invention, orderer verification is performed using biometric information, so that not only the operational effect similar to the above-described first example can be obtained but also it is possible to assure higher security performance than the case where orderer verification is performed by the certificate information such as the password.

(1-4) Fourth Example of the Electronic Commerce Method of the Present Invention

Figure 6A:
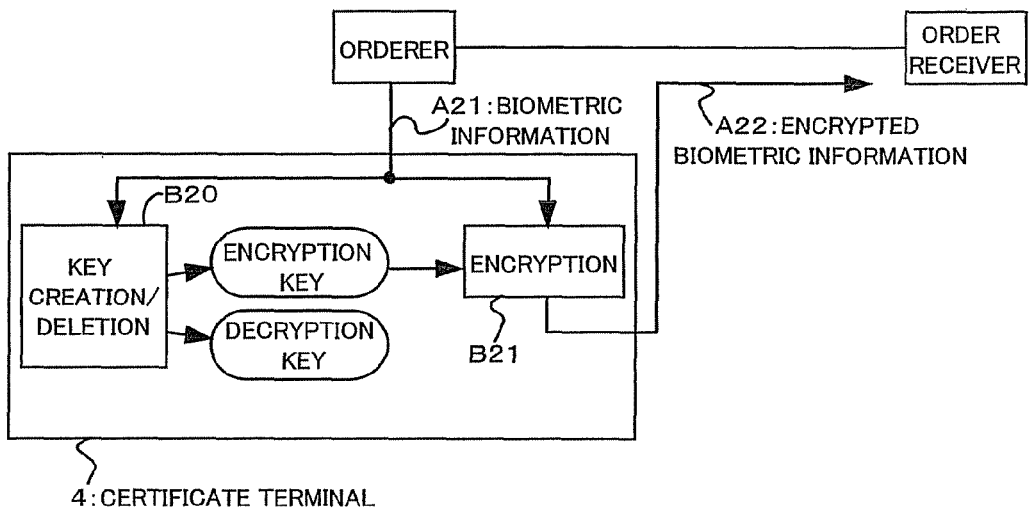
FIG. 6A and FIG. 6B are views for explaining a fourth example of the electronic commerce method of the present invention.
Figure 6B:
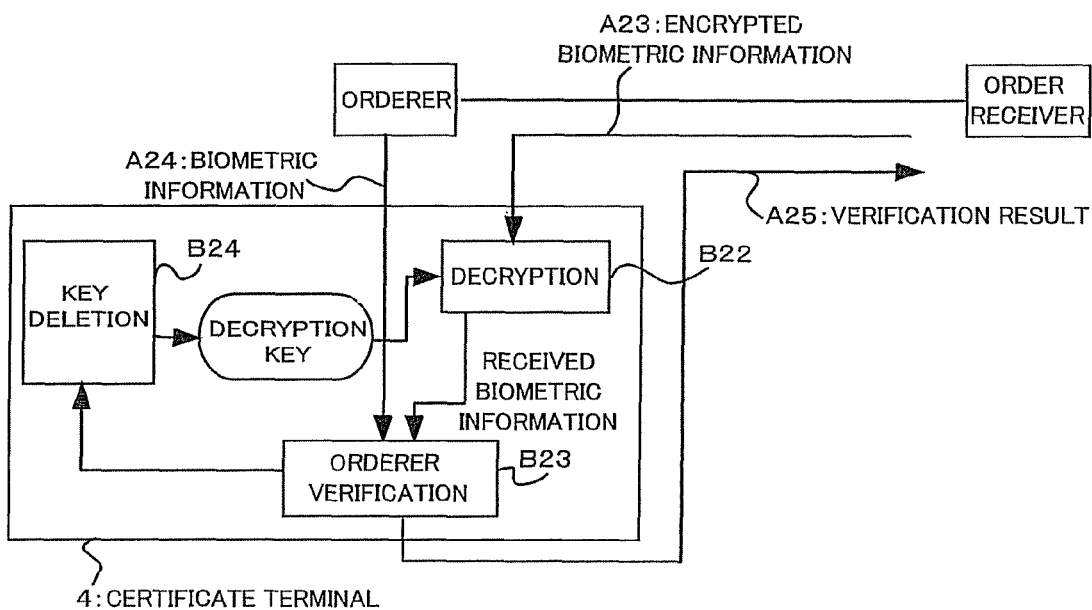
Figure 7:
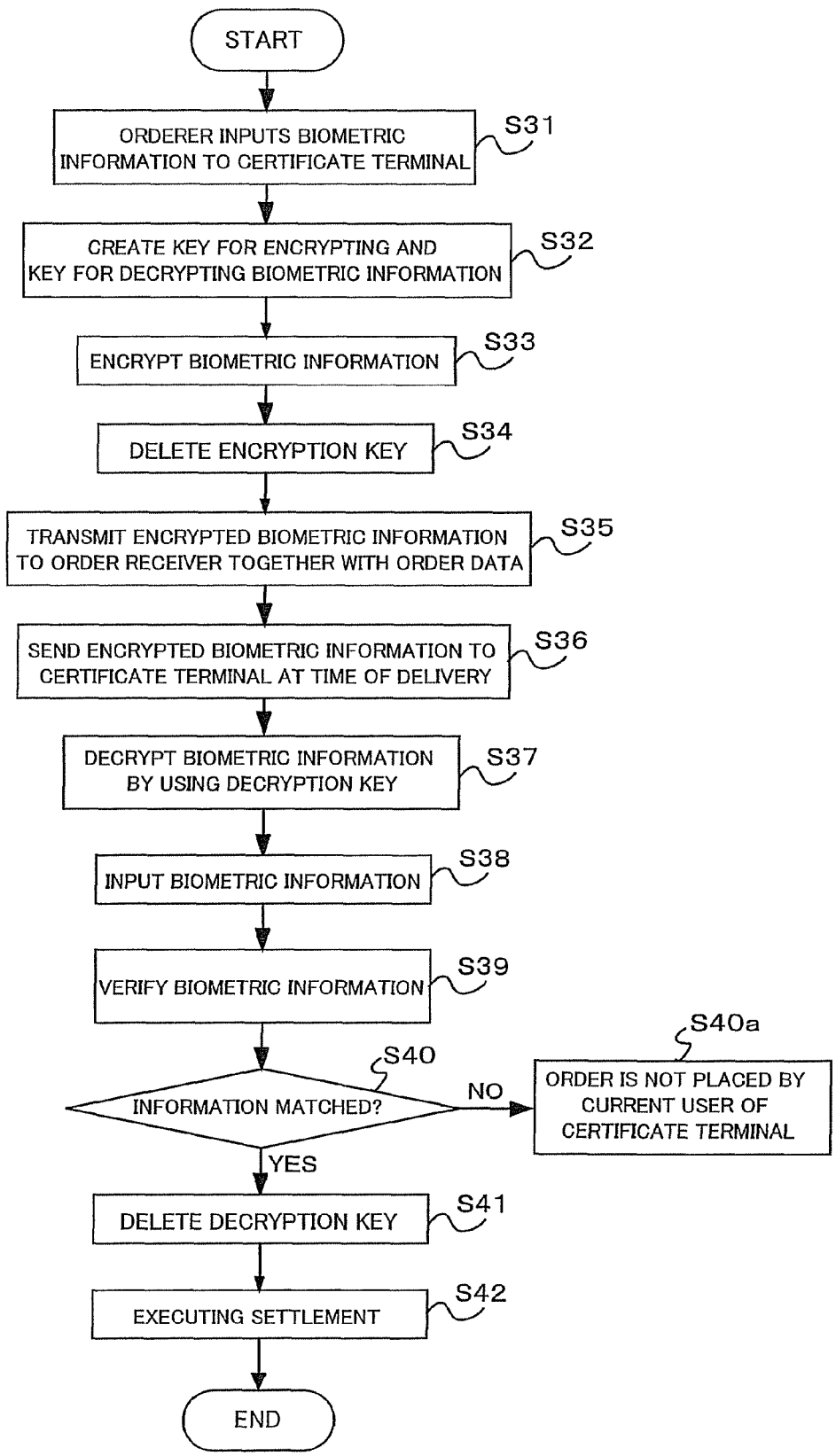
FIG. 7 is a flowchart for explaining the procedure of the fourth example of the electronic commerce method of the present invention.

FIG. 6A and FIG. 6B are the views for explaining the fourth example of the electronic commerce method of the present invention, and FIG. 7 is the flowchart (steps S31 to S42, S40a) for explaining the procedure of the fourth example of the electronic commerce method of the present invention. The fourth example of the electronic commerce method is also a method where the orderer places an order for a commodity with the order receiver via the network and the orderer himself/herself receives the commodity, but the fourth example is one that automatic creation of the encryption key and deletion of the decryption key are performed in timing described later, in the electronic commerce method shown in FIG. 4A and FIG. 4B.

When placing an order for the commodity, the orderer inputs the first orderer biometric information for identifying the orderer himself/herself to the certificate terminal 4 that the orderer owns, as shown in FIG. 6A (refer to arrow A21 and step S31). In the certificate terminal 4, each time when the first orderer biometric information is input, a predetermined encryption key and a decryption key for decrypting the encrypted information, which has been encrypted by the encryption key, are automatically created (refer to block B20 and step S32).

Then, the first orderer biometric information input on step S31 is encrypted by the encryption key created on step S32

(refer to block B21 and step S33), and the encryption key is deleted when encryption is completed (refer to block B20 and step S34). Further, the encrypted first orderer biometric information is sent to the order receiver together with the order form (received order data) of the commodity via the network (refer to arrow A22 and step S35). Note that the decryption key created on step S32 is held in the certificate terminal 4.

Next, when the order receiver delivers the commodity, the person in charge of delivery of the order receiver sends/inputs the encrypted first orderer biometric information received from the certificate terminal 4 when the order was placed for the commodity to the certificate terminal 4 that the orderer owns, as shown in FIG. 6B in the similar manner as the above-described third example (refer to arrow A23 and step S36). Further, the person in charge of delivery brings the encrypted first orderer biometric information while it is stored in the medium such as Compact Flash, and inputs the encrypted first orderer biometric information from the medium to the certificate terminal 4. The first orderer biometric information that has been input to the certificate terminal 4 is decrypted by the decryption key held in the certificate terminal 4 (refer to block B22 and step S37).

Further, the orderer inputs the second orderer biometric information for identifying the orderer himself/herself again to the certificate terminal 4 at the time of commodity delivery (refer to arrow A24 and step S38). Note that the decryption timing on step S37 and the input timing on step S38 may be opposite, similar to the above-described third example.

After that, the certificate terminal 4 verifies the first orderer biometric information decrypted on step S37 with the second orderer biometric information that has been input to the certificate terminal 4 at the time of commodity delivery on step 38 (refer to block B23 and step S39).

If the orderer biometric information do not match (NO route of step S40), the certificate terminal 4 recognizes that this order is not from the current user of the certificate terminal 4, notifies the verification result to the person in charge of delivery, the orderer, and the order receiver, and the person in charge of delivery ends the procedure without performing delivery (refer to arrow A25 and step S40a). On the other hand, when the orderer biometric information match (YES route of step S40), the certificate terminal 4 deletes the decryption key (refer to block B24 and step S41 of FIG. 7) and notifies the verification result to the person in charge of delivery, the orderer, and the order receiver (refer to arrow A25), and the person in charge of delivery hands over the commodity to the orderer and the order receiver executes the settlement of this transaction (refer to step S42).

Note that the notification of certification/verification result on step S40 to the person in charge of delivery and the orderer is performed by turning on LED (Light Emitting Diode) of the certificate terminal 4 in the same manner as the above-described third example, for example.

As described above, in the fourth example of the electronic commerce method of the present invention, the first orderer biometric information is transmitted to the order receiver after encrypting it when the order is placed for the commodity. The encryption key and the decryption key which are necessary on such occasion are automatically created in the certificate terminal 4 each time when the order is placed for the commodity, the encryption key is deleted when encryption is completed, and the decryption key is deleted when orderer verification is competed at the time of commodity delivery. With this method, the encrypted first orderer biometric information is valid for only one time order, and it is impossible to decrypt the encrypted first orderer biometric information, with which predetermined electronic commerce has been completed, even by the certificate terminal 4 that created it.

Therefore, even if the encrypted first orderer biometric information runs out to the third person, it is impossible even for the orderer himself/herself to decrypt it once the transaction has ended, and there is no danger that the third person will abuse it. Further, if delivery that the user (orderer) did not intend has been performed, the orderer can prove it as not being a valid order based on the fact that the encrypted first orderer biometric information, which the order receiver (person in charge of delivery) has brought, cannot be decrypted by the certificate terminal 4.

As described, according to the fourth example of the electronic commerce method of the present invention, not only the operational effect similar to the above-described third example is obtained but also higher security performance can be assured.

Meanwhile, explanation has been made for the case where the method, in which the encryption key and the decryption key are automatically created and the keys are deleted in predetermined timing as described above, was applied for the electronic commerce method shown in FIG. 4A and FIG. 4B. However, the present invention is not limited to this, and the above-described method is applied for the electronic commerce method shown in FIG. 1A and FIG. 1B and the electronic commerce method shown in FIG. 3 in the similar manner as the above-described fourth example, and the operational effect similar to the above-described fourth example can be obtained.

(1-5) Fifth Example of the Electronic Commerce Method of the Present Invention

Figure 8:
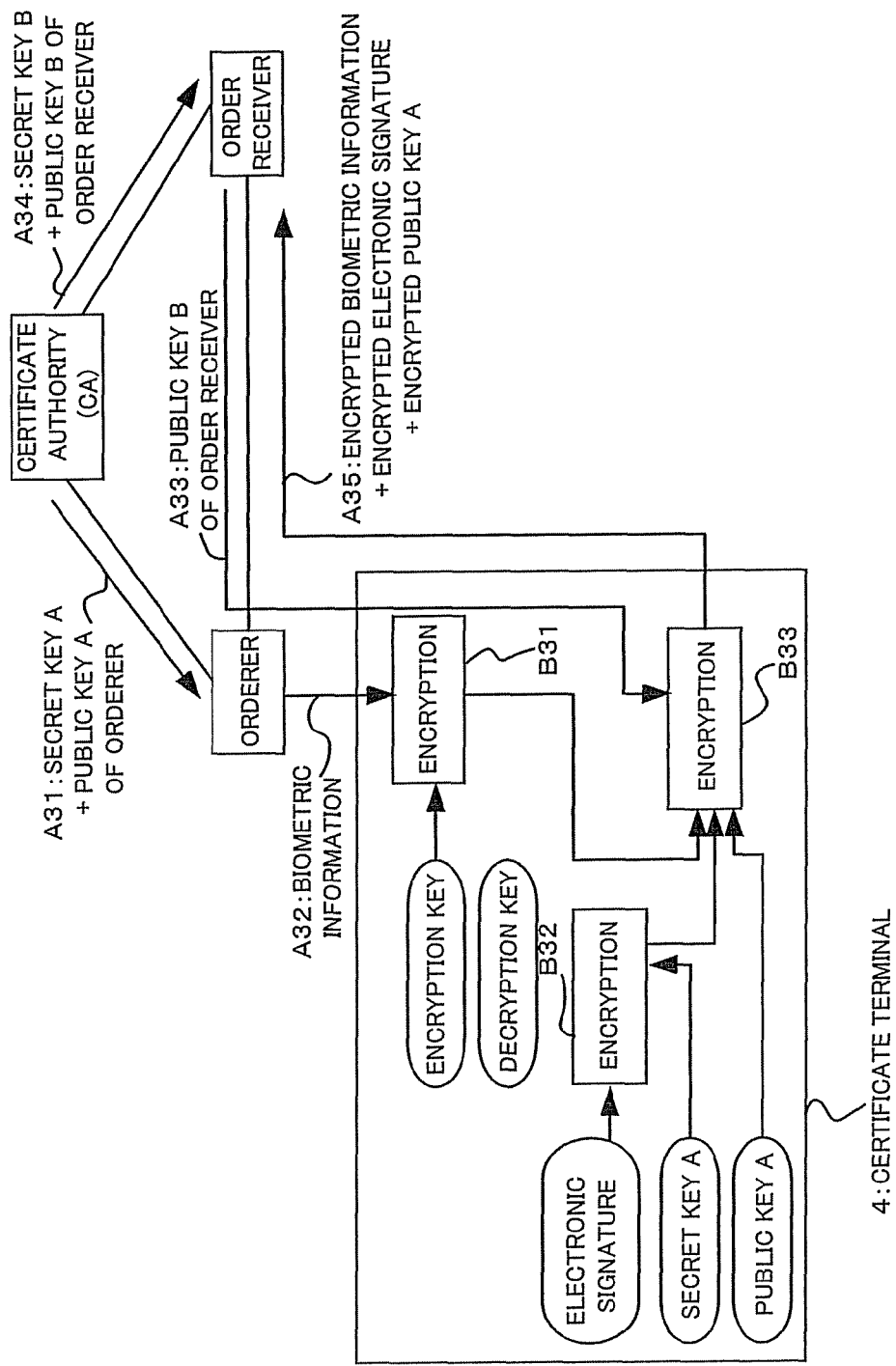
FIG. 8 is a view for explaining a fifth example of the electronic commerce method of the present invention.

FIG. 8 is the view for explaining the fifth example of the electronic commerce method of the present invention. The fifth example of the electronic commerce method is also a method where the orderer places an order for a commodity with the order receiver via the network and the orderer himself/herself receives the commodity, but the fifth example is one that PKI is incorporated as described later when the order is placed.

As shown in FIG. 8, the orderer receives the issuance of secret key A and public key A of the orderer from a certificate authority (CA) in advance of placing an order for a commodity (refer to arrow A31), and allows the certificate terminal 4 to hold them. Similarly, the order receiver also receives issuance of secret key B and public key B of the order receiver from the certificate authority (refer to arrow A32).

When placing an order for the commodity, the orderer receives public key B of the order receiver from the order receiver and allows the certificate terminal 4, which the orderer owns, to hold it (refer to arrow A33), and inputs the first orderer biometric information for identifying the orderer himself/herself to the certificate terminal 4 (refer to arrow A34). The certificate terminal 4 encrypts the first orderer biometric information (certificate information in the case of the method shown in FIG. 1A) by the encryption key (refer to block B31), and encrypts the electronic signature of the orderer by secret key A of the orderer (refer to block B32). Then, the terminal further encrypts the encrypted first orderer biometric information, the encrypted electronic signature, and public key A of the orderer by using public key B of the orderer (refer to block B33), and transmits them to the order receiver (refer to arrow A35). The order receiver decrypts information received from the orderer (certificate terminal 4) by secret key B of the order receiver, and confirms whether falsification of data or impersonation has been done or not on the network.

The subsequent procedure where the order receiver delivers the commodity is as explained referring to FIG. 4A.

As described, according to the fifth example of the electronic commerce method of the present invention, not only the operational effect similar to the above-described third example is obtained, but also falsification of information and impersonation on the network can be prevented by incorporating PKI at the time when an order is placed, and thus higher security performance can be assured.

Meanwhile, explanation has been made in the fifth example for the case where PKI was incorporated at the time when an order was placed, in the electronic commerce method shown in FIG. 4A and FIG. 4B, but the present invention is not limited to this and the method shown in FIG. 8 can be applied for the electronic commerce method shown in FIG. 1A and FIG. 1B, the electronic commerce method shown in FIG. 3, and the electronic commerce method shown in FIG. 6A and FIG. 6B in the similar manner as the above-described fifth example, and the operational effect similar to the above-described fifth example can be obtained.

(1-6) Sixth Example of the Electronic Commerce Method of the Present Invention

Figure 9:
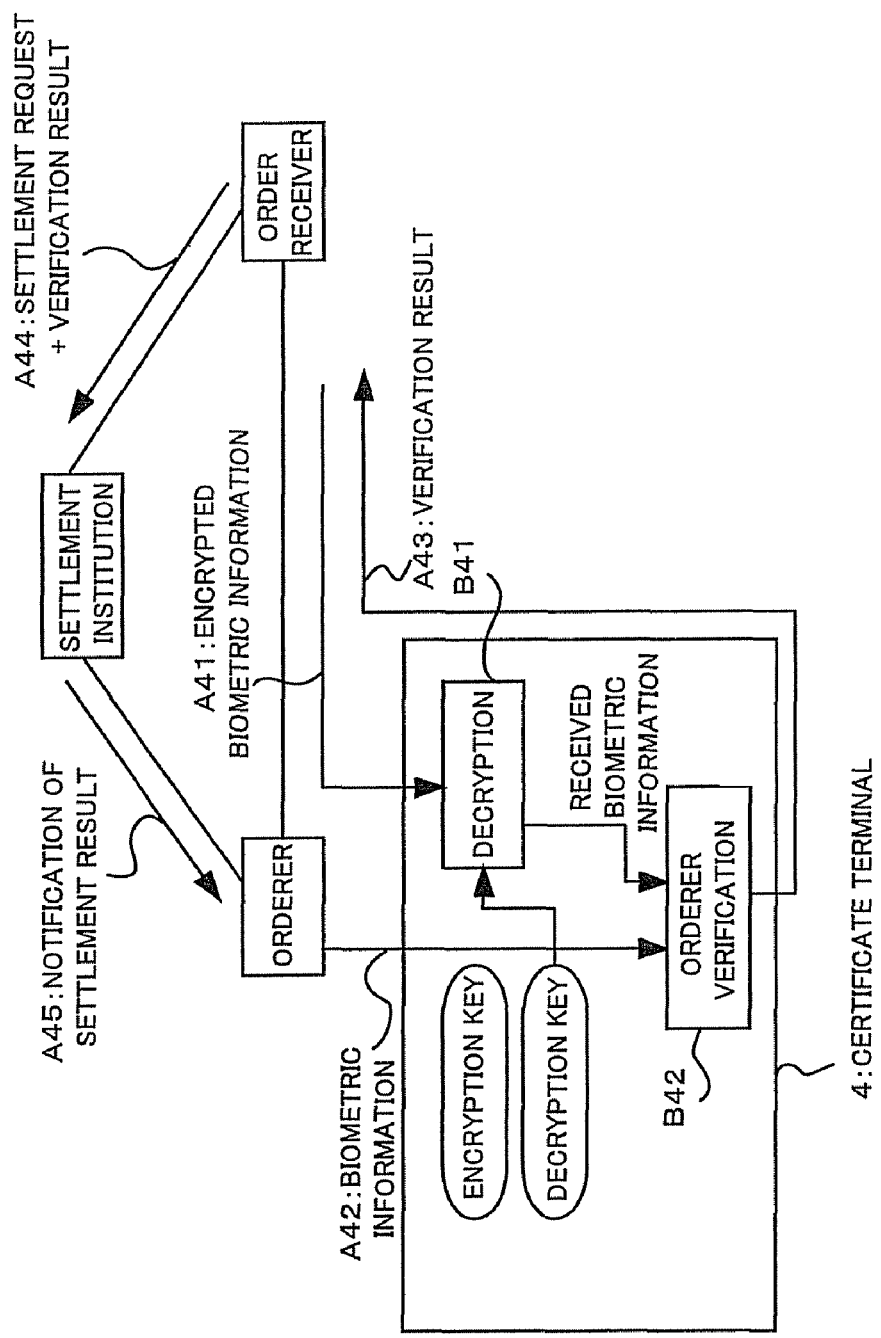
FIG. 9 is a view for explaining a sixth example of the electronic commerce method of the present invention.

FIG. 9 is the view for explaining the sixth example of the electronic commerce method of the present invention. The sixth example of the electronic commerce method is also a method where the orderer places an order for a commodity with the order receiver via the network and the orderer himself/herself receives the commodity, but the settlement procedure after delivery in the electronic commerce method shown in FIG. 4A and FIG. 4B will be explained in more detail.

After the order was placed for the commodity in the procedure shown in FIG. 4A, the person in charge of delivery of the order receiver, when the order receiver delivers the commodity, sends/inputs the encrypted first orderer biometric information, which has been received from the certificate terminal 4 at the time when the order was placed, to the certificate terminal 4 that the orderer owns as shown in FIG. 9 (refer to arrow A41). Then, the encrypted first orderer biometric information that has been input to the certificate terminal 4 is decrypted by the decryption key held in the certificate terminal 4 (refer to block B41). Further, the orderer inputs the second orderer biometric information for identifying the orderer himself/herself again to the certificate terminal 4 at the time of commodity delivery (refer to arrow A42).

After that, the certificate terminal 4 verifies the decrypted first orderer biometric information with the second orderer biometric information that has been input to the certificate terminal 4 at the time of commodity delivery (refer to block B42). When the orderer biometric information match, the certificate terminal 4 notifies the verification result to the orderer and the order receiver (refer to arrow A43), and the person in charge of delivery hands over the commodity to the orderer and the order receiver executes the settlement of this transaction.

On this occasion, the verification result by the certificate terminal 4 is sent from the order receiver to a settlement institution together with a settlement request (refer to arrow A44), and the settlement institution executes the settlement of the commodity on receiving the verification result to notify a settlement result to the orderer (refer to arrow A45).

As described, according to the sixth example of the electronic commerce method of the present invention, not only the operational effect similar to the above-described third example is obtained, but also, by performing settlement after the settlement institution receives the verification result of the certificate terminal 4 when executing settlement, the settlement is prevented from being executed before handing over of the commodity and the settlement by unauthorized order can be prevented from being executed, and thus higher security performance can be assured.

Meanwhile, explanation has been made in the sixth example for the procedure of commodity delivery and settlement after the order was placed in the procedure shown in FIG. 4A, but the present invention is not limited to this and the method of commodity delivery and settlement shown in FIG. 9 can be applied for the electronic commerce method shown in FIG. 1A and FIG. 1B, the electronic commerce method shown in FIG. 3, the electronic commerce method shown in FIG. 6A and FIG. 6B, and the electronic commerce method shown in FIG. 8 in the similar manner as the above-described sixth example, and the operational effect similar to the above-described sixth example can be obtained.

Figure 10:
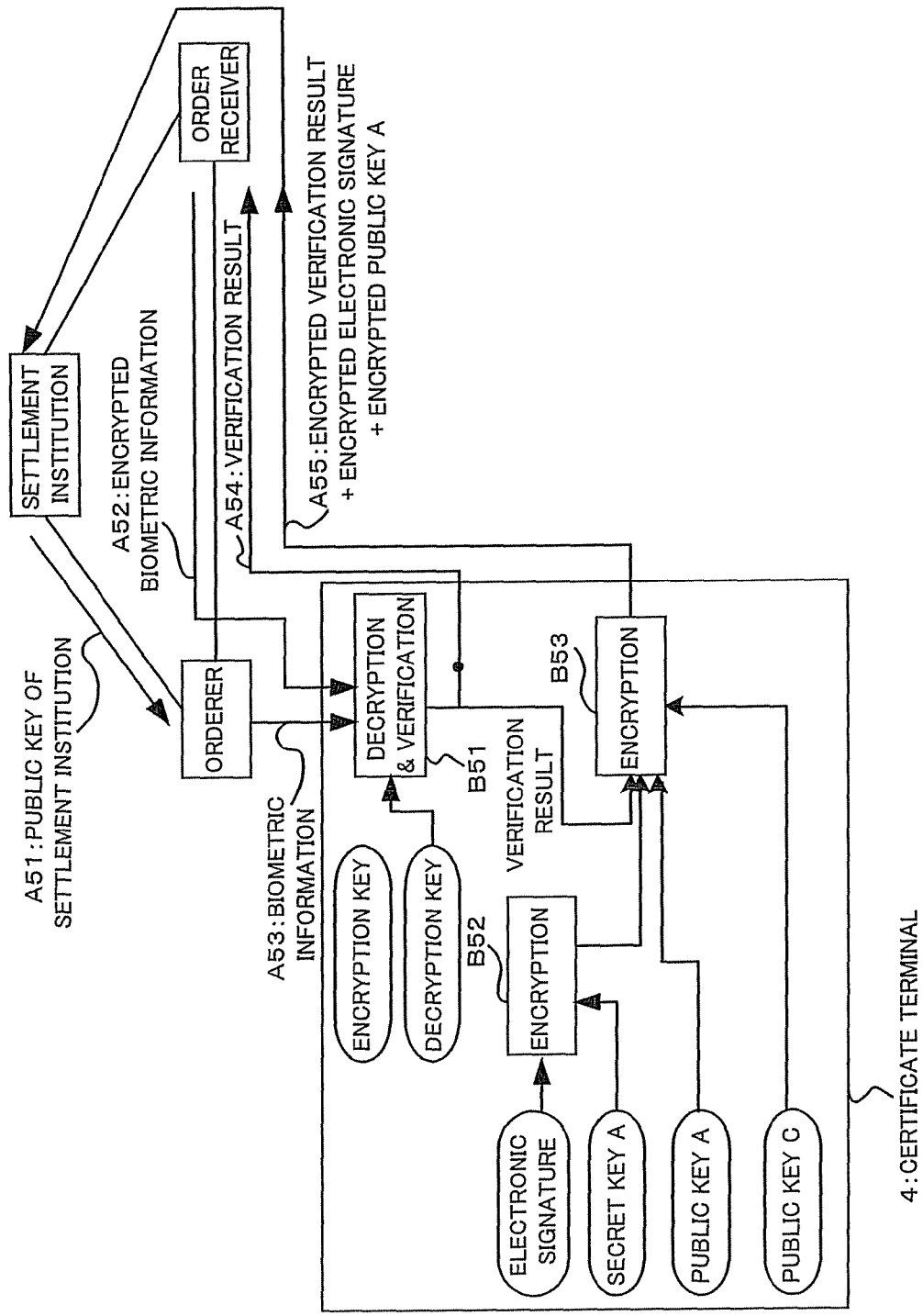
FIG. 10 is a view for explaining a seventh example of the electronic commerce method of the present invention.

(1-7) Seventh Example of the Electronic Commerce Method of the Present Invention FIG. 10 is the view for explaining the seventh example of the electronic commerce method of the present invention. The seventh example of the electronic commerce method is also a method where the orderer places an order for a commodity with the order receiver via the network and the orderer himself/herself receives the commodity, but the seventh example is one that the system of PKI is applied not only for the orderer and the order receiver but also the settlement institution, in the electronic commerce method shown in FIG. 8.

As shown in FIG. 10, secret key A and public key A of the orderer which have been issued from the certificate authority (CA) are held in the certificate terminal 4 owned by the orderer in the similar manner as the above-described fifth example, and public key C of the settlement institution, which the certificate authority has issued to the settlement institution, has been set to the certificate terminal 4 of the orderer and is held in the terminal (refer to arrow A51).

Then, after the order was placed for the commodity in the procedure shown in FIG. 8, the person in charge of delivery of the order receiver, when the order receiver delivers the commodity, sends/inputs the encrypted first orderer biometric information, which has been received from the certificate terminal 4 at the time when the order was placed, to the certificate terminal 4 that the orderer owns as shown in FIG. 10 (refer to arrow A52). Then, the encrypted first orderer biometric information that has been input to the certificate terminal 4 is decrypted by the decryption key held in the certificate terminal 4 (refer to block B51). Further, the orderer inputs the second orderer biometric information for identifying the orderer himself/herself again to the certificate terminal 4 at the time of commodity delivery (refer to arrow A53).

After that, the certificate terminal 4 verifies the decrypted first orderer biometric information with the second orderer biometric information that has been input to the certificate terminal 4 at the time of commodity delivery (refer to block B51). When the orderer biometric information match, the certificate terminal 4 notifies the verification result to the person in charge of delivery, the orderer and the order receiver (refer to arrow A54), and the person in charge of delivery hands over the commodity to the orderer.

Furthermore, the certificate terminal 4, when notifying the above-described verification result to the order receiver and the settlement institution, encrypts the electronic signature of the orderer by secret key A of the orderer (refer to block B52), further encrypts the above-described verification result, the encrypted electronic signature, and public key A of the orderer by using public key C of the settlement institution (refer to block B53), and transmits them to the settlement institution via the order receiver (refer to arrow A55).

Then, the settlement institution decrypts the encrypted verification result from the certificate terminal 4 by secret key C of the settlement institution (one makes a pair with public key C issued by the certificate authority in advance) to obtain a decrypted verification result, and executes the settlement of commodity according to the decrypted verification result.

As described, according to the seventh example of the electronic commerce method of the present invention, not only the operational effect similar to the above-described fifth example is obtained, but also, by applying the system of PKI for the orderer, the order receiver and for the settlement institution and executing settlement in the settlement institution by using the decrypted verification result, falsification and impersonation on the network are removed and electronic commerce capable of more accurate principal certification can be realized.

Meanwhile, explanation has been made in the seventh example for the procedure of commodity delivery and settlement after the order was placed in the procedure shown in FIG. 8, but the present invention is not limited to this and the method of commodity delivery and settlement shown in FIG. 10 can be applied for the electronic commerce method shown in FIG. 1A and FIG. 1B, the electronic commerce method shown in FIG. 3, and the electronic commerce method shown in FIG. 6A and FIG. 6B, in the similar manner as the above-described seventh example, and the operational effect similar to the above-described seventh example can be obtained.

In the above-described first to seventh examples of the electronic commerce method of the present invention, the encrypted certificate information or the encrypted first orderer biometric information is decrypted in the certificate terminal (1, 4) owned by the orderer at the time of commodity delivery, and the decrypted information is verified with the certificate information or the second orderer biometric information, which the orderer input at the time of commodity delivery. Thus, the orderer, only by inputting the certificate information or the biometric information to the certificate terminal (1, 4) when placing an order, the orderer can place an order in which certification of himself/herself can be made. On such occasion, since the certificate information or the biometric information is sent to the order receiver after it is encrypted, it can be prevented from being abused by the third person having malicious intent even if the encrypted information runs out. Further, in the case of using PKI, the secret key and the public key are held in the certificate terminal (1, 4) and they are controlled by the certificate information or the biometric information, so that key control of sophisticated security performance can be easily done. On the other hand, since the order receiver can surely perform principal certification to the orderer at the time of commodity delivery and settlement, unauthorized transaction by a person having malicious intent can be eliminated and business risk can be reduced.

(1-8) Eighth Example of the Electronic Commerce Method of the Present Invention

Meanwhile, the orderer himself/herself always must receive commodity delivery and an agent cannot receive the commodity in the above-described electronic commerce methods. Generally, an orderer and a recipient of commodity are different in many cases, and a valid agent entrusted by the orderer should be allowed to receive the commodity for which the orderer placed an order.

Figure 11A:
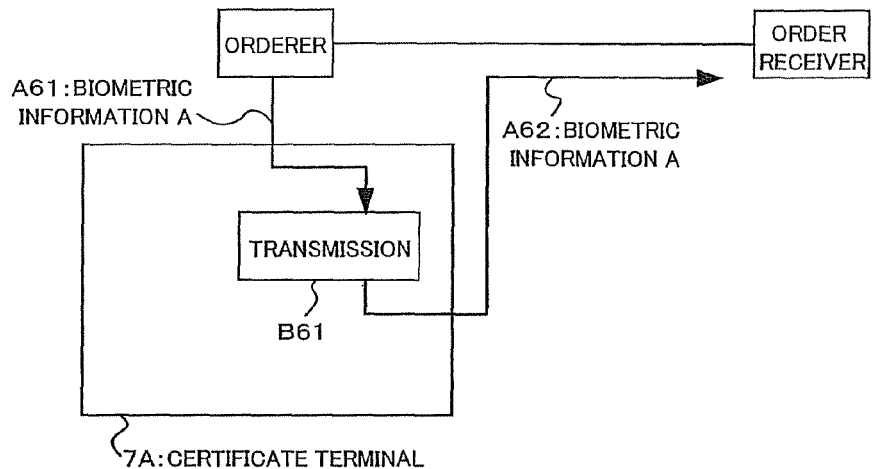
FIG. 11A, FIG. 11B and FIG. 11C are views for explaining an eighth example of the electronic commerce method (principal certification method by an agent) of the present invention.
Figure 11B:
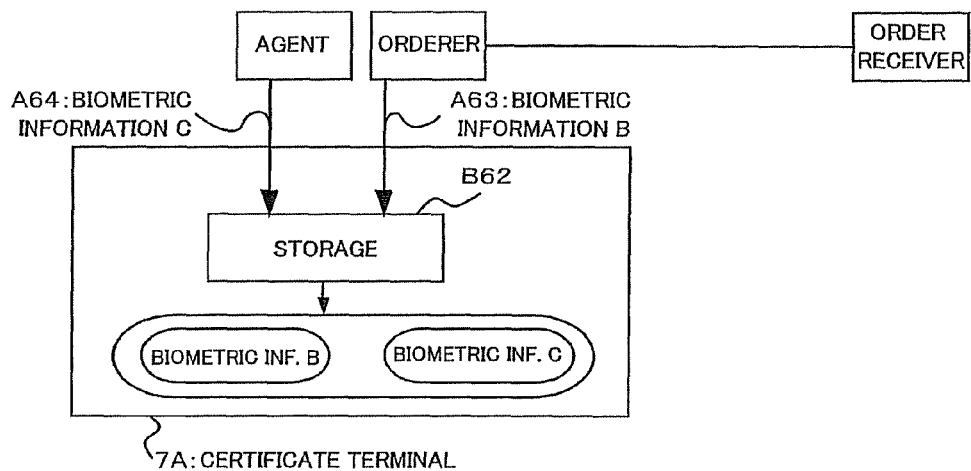
Figure 11C:
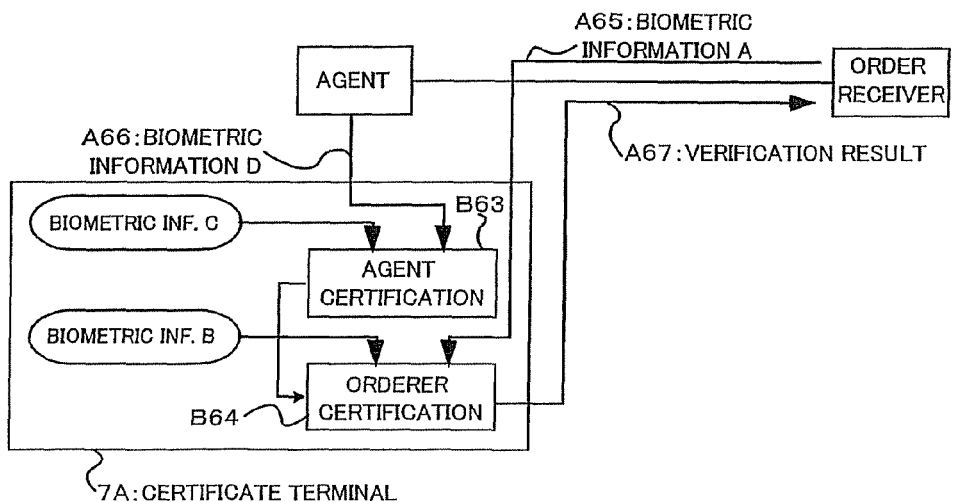

FIG. 11A, FIG. 11B and FIG. 11C are the views for explaining the eighth example of the electronic commerce method of the present invention (principal certification method by an agent), and the eighth example of the electronic commerce method is a method where the orderer places an order for a commodity with an order receiver via the network and an agent entrusted by the orderer receives the commodity.

When placing an order for the commodity, the orderer (certified person) inputs first order biometric information (first certified person biometric information) A for identifying the orderer himself/herself (certified person himself/herself) to a certificate terminal 7A owned by the orderer (refer to arrow A61). The first orderer biometric information A that has been input in the certificate terminal 7A is sent to the order receiver (dealer who needs principal certification result of the certified person) together with the order form of commodity (received order data) via the network (refer to arrow A62 and block B61).

After that, when the orderer cannot perform principal certification at the time of receiving commodity, the orderer entrusts the agent to receive the commodity. On such occasion (at the time of agent registration), as shown in FIG. 11B, the orderer inputs second orderer biometric information (second certified person biometric information) B for identifying the orderer himself/herself again to the certificate terminal 7A in advance (refer to arrow A63), the agent entrusted by the orderer inputs first agent biometric information C for identifying the agent himself/herself to the terminal (refer to arrow A64), and the certificate terminal 7A stores/holds the second orderer biometric information B and the first agent biometric information C in a coordinated manner (refer to block B62).

Next, when the order receiver delivers the commodity (at the time of principal certification of the certified person), as shown in FIG. 11C, the person in charge of delivery of the order receiver sends/inputs the first orderer biometric information A, which has been received from the certificate terminal 7A at the time when the order was placed, to the certificate terminal 7A that the agent owns on behalf of the orderer (certified person) (refer to arrow A65). At this point, the certificate terminal 7A is equipped with a slot for medium such as Compact Flash® card, for example, similar to the above-described first example. The person in charge of delivery brings the first orderer biometric information A while it is stored in the medium such as Compact Flash, and inserts the medium into the slot to input the first orderer biometric information A to the certificate terminal 7A.

Further, the agent inputs second agent biometric information D for identifying the agent himself/herself to the certificate terminal 7A again at the time of commodity delivery (at the time of certification) (refer to arrow A66).

Then, the certificate terminal 7A verifies the first agent biometric information C held in the certificate terminal 7A with the second agent biometric information D that has been input by the agent again at the time of commodity delivery, and certifies that the agent who is about to receive the commodity is the valid agent entrusted by the orderer (refer to block B63).

If the agent biometric information (C, D) do not match and it is certified that the recipient is not the valid agent, the certificate terminal 7A notifies it to the person in charge of delivery, the recipient (agent) and the order receiver, and the person in charge of delivery ends the procedure without performing delivery. On the contrary, when the agent biometric information (C, D) match and it is certified that the recipient is the valid agent, the certificate terminal 7A verifies the first orderer biometric information A, which has been input by the person in charge of delivery, with the second orderer biometric information held in the certificate terminal 7A, and performs principal certification to the orderer (certified person) (refer to block B64).

If the order biometric information (A, B) do not match, the certificate terminal 7A recognizes that this order is not from the current user of the certificate terminal 7A, notifies the verification result (certification result) to the person in charge of delivery, the agent, and the order receiver (refer to arrow A67), and the person in charge of delivery ends the procedure without performing delivery. On the other hand, when the orderer biometric information (A, B) match, the certificate terminal 7A notifies the verification result (certification result) to the person in charge of delivery, the agent, and the order receiver (refer to arrow A67), and the person in charge of delivery hands over the commodity to the agent and the order receiver executes the settlement of this transaction.

As described, according to the eighth example of the electronic commerce method of the present invention, the certificate terminal 7A is allowed to hold the biometric information C of the agent and the biometric information B of the orderer in advance, the person in charge of delivery (dealer) inputs the biometric information A of the orderer, which has been sent from the certificate terminal 7A, to the certificate terminal 7A and the agent inputs his/her own biometric information D to the certificate terminal at the time of commodity delivery (at the time of principal certification of the orderer who is a certificated person). Then, when principal certification is performed to the agent and the agent is certified as the principal (valid agent) in the certificate terminal 7A, principal certification is performed to the orderer (certified person) by the biometric information A of the orderer, which has been input by the person in charge of delivery, and the agent and the biometric information B of the orderer, which is held in the certificate terminal 7A in advance. Therefore, in receiving the commodity or the like, receiving not only the orderer himself/ herself but also by the agent specified by the orderer himself/ herself is made possible while security is ensured, and convenience improves significantly.

Meanwhile, although not shown in FIG. 11A to FIG. 11C, it is desirable to delete the biometric information B and C in the certificate terminal 7A after certification of the orderer in block B64 is completed. Thus, principal certification by agent can be done only once, and misappropriation by the agent can be suppressed.

Furthermore, in the eighth example, the orderer inputs the biometric information (A, B) when placing an order for the commodity and when registering the agent, severally. The first (when placing an order for the commodity) input information A is held in the certificate terminal 7A and the held biometric information A may be used as the biometric information B when registering the agent, but in this case, an unauthorized action could occur that an unauthorized agent performs agent registration with the certificate terminal 7A without obtaining certificate from the orderer. For this reason, it is desirable to input/store the biometric information B of the orderer again at the time of agent registration as described above.

(1-9) Ninth Example of the Electronic Commerce Method of the Present Invention

Figure 12A:
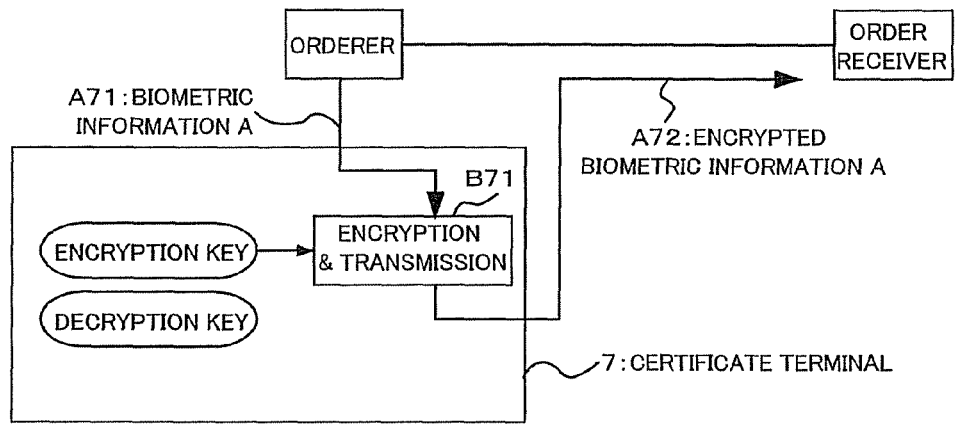
FIG. 12A, FIG. 12B and FIG. 12C are views for explaining a ninth example of the electronic commerce method (principal certification method by an agent) of the present invention.
Figure 12B:
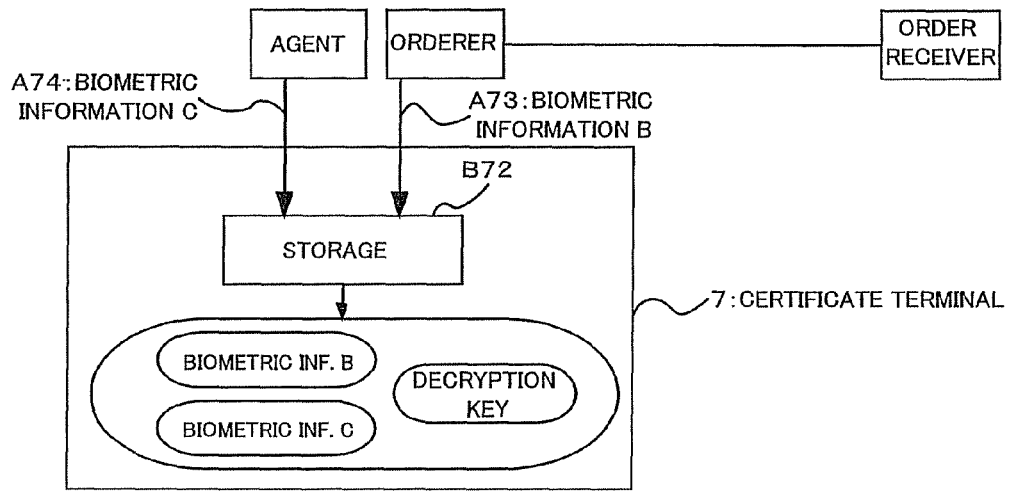
Figure 12C:
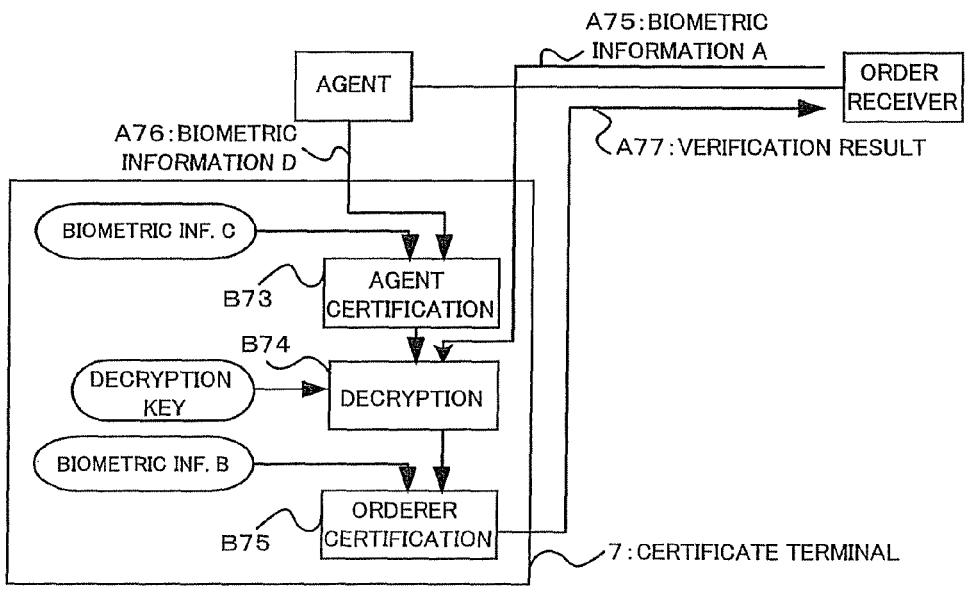

FIG. 12A, FIG. 12B and FIG. 12C are the views for explaining the ninth example of the electronic commerce method of the present invention (principal certification method by an agent), and the ninth example of the electronic commerce method is also a method where the orderer places an order for a commodity with an order receiver via the network and an agent entrusted by the orderer receives the commodity, but the ninth example is designed to encrypt the first orderer biometric information A that has been directly sent as it was from the orderer to the order receiver in the eighth example. In short, the ninth example is one where the methods of the above-described first example to the seventh example (the first example or the third example, particularly) and the method of the above-described eighth example are combined.

When placing an order for the commodity, as shown in FIG. 12A, the orderer (certified person) inputs the first orderer biometric information (first certified person biometric information) A for identifying the orderer himself/herself (certified person himself/herself) to the certificate terminal 7 that the orderer owns (refer to arrow A71). In the certificate terminal 7, the first orderer biometric information A that has been input is encrypted by the predetermined encryption key held in the certificate terminal 7 (refer to block B71), and the encrypted first orderer biometric information A is sent to the order receiver (dealer who needs the principal certification result of the certified person) together with the order form of commodity (received order data) via the network (refer to arrow A72 and block B71). At this point, the decryption key for decrypting the encrypted first orderer biometric information A, which has been encrypted in block B71, is held in the certificate terminal 7.

After that, when the orderer cannot perform principal certification at the time of receiving commodity, the orderer entrusts the agent to receive the commodity. On such occasion (at the time of agent registration), as shown in FIG. 12B, the orderer inputs the second orderer biometric information (second certified person biometric information) B for identifying the orderer himself/herself again to the certificate terminal 7 in advance (refer to arrow A73), the agent entrusted by the orderer inputs the first agent biometric information C for identifying the agent himself/herself to the terminal (refer to arrow A74), and the certificate terminal 7 stores/holds the above-described decryption key, the second orderer biometric information B and the first agent biometric information C in a coordinated manner (refer to block B72).

Next, when the order receiver delivers the commodity (at the time of principal certification of the certified person), as shown in FIG. 12C, the person in charge of delivery of the order receiver sends/inputs the first orderer biometric information A, which has been received from the certificate terminal 7 at the time when the order was placed, to the certificate terminal 7 that the agent owns on behalf of the orderer (certified person) (refer to arrow A75). At this point, the certificate terminal 7 is equipped with a slot for medium such as Compact Flash® card, for example, similar to the above-described first example. The person in charge of delivery brings the first orderer biometric information A while it is stored in the medium such as Compact Flash, and inserts the medium into the slot to input the encrypted first orderer biometric information A to the certificate terminal 7.

Further, the agent inputs the second agent biometric information D for identifying the agent himself/herself to the certificate terminal 7 again at the time of commodity delivery (at the time of certification) (refer to arrow A76).

Then, the certificate terminal 7 verifies the first agent biometric information C held in the certificate terminal 7 with the second agent biometric information D that has been input by the agent again at the time of commodity delivery, and certifies that the agent who is about to receive the commodity is the valid agent entrusted by the orderer (refer to block B73).

If the agent biometric information (C, D) do not match and it is certified that the recipient is not the valid agent, the certificate terminal 7 notifies it to the person in charge of delivery, the recipient (agent) and the order receiver, and the person in charge of delivery ends the procedure without performing delivery. On the contrary, when the agent biometric information (C, D) match and it is certified that the recipient is the valid agent, the certificate terminal 7 decrypts the encrypted biometric information A, which has been input by the person in charge of delivery, by the decryption key held in the certificate terminal 7 (refer to block B74), verifies the first orderer biometric information A, which has been decrypted in block B74, with the second orderer biometric information held in the certificate terminal 7, and performs principal certification to the orderer (certified person) (refer to block B75).

If the order biometric information (A, B) do not match, the certificate terminal 7A recognizes that this order is not from the current user of the certificate terminal 7, notifies the verification result (certification result) to the person in charge of delivery, the agent, and the order receiver (refer to arrow A77), and the person in charge of delivery ends the procedure without performing delivery. On the other hand, when the orderer biometric information (A, B) match, the certificate terminal 7 notifies the verification result (certification result) to the person in charge of delivery, the agent, and the order receiver (refer to arrow A77), and the person in charge of delivery hands over the commodity to the agent and the order receiver executes the settlement of this transaction.

As described, according to the ninth example of the electronic commerce method of the present invention, not only the operational effect similar to the above-described eighth example is obtained but also the operational effect similar to the above-described first example and the above-described third example can be obtained.

Note that, in the ninth example as well, the method that the encryption key and the decryption key are automatically created and the keys are deleted on predetermined timing as in the above-described fourth example may be applied, and furthermore, the methods explained in the above-described fifth example to seventh example may be applied.

(1-10) Tenth Example of the Electronic Commerce Method of the Present Invention

In the tenth example (not shown) of the electronic commerce method of the present invention, when the verification result between the first orderer biometric information A and the second orderer biometric information B is completely the same after performing the orderer certification (refer to block B64, B75) of the above-described eighth example and ninth example, the certificate terminals (7A, 7) are designed to certify it as verification-unmatched (certification impossible).

Generally, different information is taken each time as biometric information. For example, when the biometric information is fingerprint data, fingerprint data taken is different each time depending on finger pressure, moisture, temperature, humidity or the like of an occasion when the fingerprint data is taken. Therefore, when two fingerprint data match completely, it is presumed that the fingerprint data has been illegally obtained using some kind of means (collecting fingerprint and digitizing it, for example).

To eliminate such an unauthorized action, the tenth example determines "certification impossible" when the biometric information (A, B) at the time of orderer certification in the certificate terminal (7A, 7) completely match. Thus, higher security performance can be assured.

(1-11) Eleventh Example of the Electronic Commerce Method of the Present Invention Regarding the eleventh example (not shown) of the electronic commerce method of the present invention, in the method where the first orderer biometric information (first certified person biometric information) is encrypted and sent to the order receiver (dealer) out of the above-described electronic commerce methods, the certificate terminal that the orderer (certified person) owns applies specific reversible process to the first orderer biometric information before encrypting the first orderer biometric information when placing an order for the commodity, applies opposite process to the reversible process, which has been performed when the order was placed for the commodity, to the decrypted first orderer biometric information at the time of commodity delivery to restore the first orderer biometric information.

Consequently, even if the encryption of the encrypted first orderer biometric information is broken, misappropriation of the biometric information by the third person can be prevented, and higher security performance can be assured.

Specifically, when the biometric information is a fingerprint image, the fingerprint image is expanded and contracted by a particular pattern. For example, process is applied such that the upper portion of the image is expanded vertically and the lower portion of the image is expanded horizontally. At this point, parameter of applied process (expansion weighting factor) is held in the certificate terminal. By adding the process, the fingerprint data is different from the original fingerprint, and it is impossible for the third person to obtain the original fingerprint image. Moreover, by changing process parameter each time, different fingerprint images are formed each time, and it makes analogy of the original fingerprint image even more difficult.

(1-12) Twelfth Example of the Electronic Commerce Method of the Present Invention Regarding the twelfth example (not shown) of the electronic commerce method of the present invention, in the first example to eleventh example of the above-described electronic commerce methods, the order receiver (dealer) is a financial institution, the orderer is a loanee who borrows money from the financial institution, and money is loaned between the orderer and the order receiver. In this case, the time when an order is placed for a commodity and the time of making the agreement of money consumption loan between the loanee and the financial institution corresponds to the above-described time when the order is placed for the commodity, and the time when the loanee or the agent borrow money from the financial institution corresponds to the time of commodity delivery (time of certification).

As described, by exchanging money as the commodity by using the first example to eleventh example of the electronic commerce methods of the present invention, money loan business can be established.

Specifically explained, the loaner (orderer) applies for loan (agreement of money consumption loan) to a loan company (order receiver, financial institution) via the network such as the Internet. On such occasion, he/she sends the biometric information of the loanee (first orderer biometric information) to the loan company together with an application. The loan company, when handing over money to the loanee, inputs the biometric information received from the loanee at the time of application to the certificate terminal of the loanee, and performs certification that the recipient of money is the principal who has applied for the loan.

Conventionally, in making a money loan, the loanee (orderer) has gone to a teller window of the loan company or an ATM (Automated Teller Machine) terminal of the loan company to make the agreement of money consumption loan. By applying the above-described first example to eleventh example, as explained in the twelfth example, the agreement of money consumption loan is made through the Internet or the like and the loanee (orderer) himself/herself can receive money at home or the agent specified by the loanee (orderer) can receive money.

Further, the loan company (financial institution) has gained customers by arranging unmanned stores or the like throughout town. However, a problem has occurred such that a customer was robbed at night near the ATM terminal of an unmanned store, the problem has been a business risk to the loan company. Then, by using the method explained in the above-described twelfth example, the loanee is able to apply for a loan at a place like an Internet cafe capable of connecting to the Internet if he/she only has the certificate terminal, and the loan company can send an employee from a closest manned store (branch) to hand over money. Consequently, the loan company does not need to spread unmanned stores and can reduce the business risk such as robbery.

(1-13) Thirteenth Example of the Electronic Commerce Method of the Present Invention The thirteenth example (not shown) of the electronic commerce method of the present invention is a method of loaning money as the commodity between the loaner being the orderer and the financial institution as the order receiver via the network, and it relates to a method of keeping history of occasion where the loanee paid back. In the thirteenth example, electronic commerce is performed basically in a procedure substantially the same as the above-described first example to third example as explained in a first to a third aspects below.

The first aspect of the thirteenth example is executed according to the same procedure as the above-described first example, and is specifically executed in the following procedure A-1 to A-4.

A-1 The loanee inputs certificate information for identifying the loanee himself/herself to the certificate terminal 1 that the loanee owns (refer to FIG. 1A, FIG. 1B) at the time of making the agreement of money consumption loan between the loanee and the financial institution.

A-2 The certificate terminal 1 encrypts the certificate information by a predetermined encryption key, sends encrypted certificate information to the financial institution via the network, and holds the certificate information and a decryption key for decrypting the encrypted certificate information.

A-3 When the loanee pays money back to the financial institution, the financial institution inputs the encrypted certificate information, which has been received from the certificate terminal 1 at the time of making the agreement of money consumption loan, to the certificate terminal 1, and the loanee inputs data (principal certification key such as a password, for example) necessary for decrypting the encrypted certificate information to the certificate terminal 1.

A-4 The certificate terminal 1 verifies data input on the above-described procedure A-3 with the principal certification key previously held in the certificate terminal 1. When they match, the terminal decrypts the encrypted certificate information, which has been input by the financial institution, by the decryption key held in the certificate terminal 1, verifies decrypted certificate information with the certificate information held in the certificate terminal 1, and stores the verification result in the certificate terminal 1. Thus, it is certified that the loanee himself/herself is making payback, and the payback history is kept in the certificate terminal 1.

Further, the second aspect of the thirteenth example is executed by applying the same procedure as the above-described second example to the first aspect of the above-described thirteenth example. Specifically, in the second aspect, the certificate terminal 1 (refer to FIG. 3) holds the biometric information of the loanee together with the certificate information and the decryption key on the above-described procedure A-2, the loanee inputs his/her own biometric information to the certificate terminal 1 as data necessary for decrypting the encrypted certificate information on the above-described procedure A-3, and the certificate terminal 1 verifies the biometric information, which has been input by the loanee at the time of payback, with the biometric information previously held in the certificate terminal 1 and decrypts the encrypted certificate information by the decryption key held in the certificate terminal 1 when the biometric information match on the above-described procedure A-4.

Furthermore, the third aspect of the thirteenth example is executed according to the same procedure as the above-described third example, and it is specifically executed by the following procedure B-1 to B-4.

B-1 The loanee (orderer) inputs the first orderer biometric information for identifying the loanee himself/herself to the certificate terminal 4 that the loanee owns (refer to FIG. 4A, FIG. 4B) at the time of making the agreement of money consumption loan between the loanee and the financial institution.

B-2 The certificate terminal 4 encrypts the first orderer biometric information by a predetermined encryption key, sends encrypted first orderer biometric information to the financial institution via the network, and holds a decryption key for decrypting the encrypted first orderer biometric information.

B-3 When the loanee pays money back to the financial institution, the financial institution inputs the encrypted first orderer biometric information, which has been received from the certificate terminal 4 at the time of making the agreement of money consumption loan, to the certificate terminal 4, and the loanee (orderer) inputs second orderer biometric information for decrypting the loanee himself/herself to the certificate terminal 4.

B-4 The certificate terminal 4 decrypts the encrypted first orderer biometric information, which has been input by the financial institution, by the decryption key held in the certificate terminal 4, verifies decrypted first orderer biometric information with the second orderer biometric information, which has been input on the above-described procedure B-3, and stores the verification result in the certificate terminal 4. Thus, it is certified that the loanee himself/herself is making payback, and the payback history is kept in the certificate terminal 4.

By using the method of the thirteenth example, when the loanee who borrowed money in the method of the above-described twelfth example pays the money back to the loan company (financial institution), it is certified by using the certificate information including the biometric information that the loanee himself/herself is making payback, and the payback history can be kept in the certificate terminal (1, 4).

Meanwhile, by further applying the methods explained in the above-described eighth example to tenth example for the thirteenth example, the agent specified by the loanee can perform payback certification and can keep the payback history in the certificate terminal on behalf of the loanee. Further, the methods explained in the above-described fourth example to seventh example may be applied for the thirteenth example, and in this case, the operational effect similar to each of the above-described fourth to seventh example can be obtained.

(1-14) Fourteenth Example of the Electronic Commerce Method of the Present Invention The fourteenth example (not shown) of the electronic commerce method of the present invention is a method where the remitter requests the financial institution by the remitter's terminal via the network to perform remittance from the remitter's account to the recipient. Specifically, it is a method where the remitter and the recipient are in remote places, the terminal owned by the remitter and the certificate terminal owned by the recipient are connected communicably with each other via the network, and remittance is performed to the recipient who does not have an account in the above-described financial institution. In the fourteenth example, electronic commerce is basically performed in substantially the same procedure as the above-described first example to third example, as explained as the first to the third aspects below.

The first aspect of the fourteenth example is executed according to the same procedure as the above-described first example, and it is specifically executed by the following procedure C-1 to C-6.

C-1 The recipient inputs the certificate information for identifying the recipient himself/herself to the certificate terminal 1 owned by the recipient (refer to FIG. 1A, FIG. 1B).

C-2 The certificate terminal 1 encrypts the certificate information by a predetermined encryption key, sends encrypted certificate information to the remitter's terminal via the network, and holds the certificate information and a decryption key for decrypting the encrypted certificate information.

C-3 The remitter's terminal sends the encrypted certificate information from the certificate terminal 1 to the financial institution together with a remittance request via the network.

C-4 When the recipient receives money from the remitter, a person in charge of remittance of the financial institution inputs the encrypted certificate information, which has been received from the remitter's terminal, to the certificate terminal 1 owned by the recipient and the recipient inputs data (principal certification key such as a password, for example) necessary for decrypting the encrypted certificate information to the certificate terminal 1.

C-5 The certificate terminal 1 verifies data input on the above-described procedure C-4 with the principal certification key previously held in the certificate terminal 1. When they match, the terminal decrypts the encrypted certificate information, which has been input by the person in charge of remittance, by the decryption key held in the certificate terminal 1, verifies decrypted certificate information with the certificate information held in the certificate terminal 1, and when the certificate information match, notifies it to the recipient and the person in charge of remittance.

C-6 The person in charge of remittance hands over the money from the remitter to the recipient on receiving verification-matched notification from the certificate terminal 1.

Further, the second aspect of the fourteenth example is executed by applying the same procedure as the above-described second example to the first aspect of the above-described fourteenth example. Specifically, in the second aspect, the certificate terminal 1 (refer to FIG. 3) holds the biometric information of the orderer together with the certificate information and the decryption key on the above-described procedure C-2, the recipient inputs his/her own biometric information to the certificate terminal 1 as data necessary for decrypting the encrypted certificate information on the above-described procedure C-4, and the certificate terminal 1 verifies the biometric information, which has been input by the recipient at the time of receiving money, with the biometric information previously held in the certificate terminal 1 and decrypts the encrypted certificate information by the decryption key held in the certificate terminal 1 when the biometric information match on the above-described procedure C-5.

Furthermore, the third aspect of the fourteenth example is executed according to the same procedure as the above-described third example, and it is specifically executed by the following procedure D-1 to D-6.

D-1 The recipient inputs first recipient biometric information for identifying the recipient himself/herself to the certificate terminal 4 of the recipient (refer to FIG. 4A, FIG. 4B).

D-2 The certificate terminal 4 encrypts the first recipient biometric information by a predetermined encryption key, sends encrypted first recipient biometric information to the remitter's terminal via the network, and holds a decryption key for decrypting the encrypted first recipient biometric information.

D-3 The remitter's terminal sends the encrypted first recipient biometric information from the certificate terminal 4 to the financial institution together with a remittance request via the network.

D-4 When the recipient receives money from the remitter, the person in charge of remittance of the financial institution inputs the encrypted first recipient biometric information, which has been received from the remitter's terminal, to the certificate terminal 4 and the recipient inputs second recipient biometric information for identifying the recipient himself/herself to the certificate terminal 4.

D-5 The certificate terminal 4 decrypts the encrypted first recipient biometric information, which has been input by the person in charge of remittance, by the decryption key held in the certificate terminal 4, verifies encrypted first recipient biometric information, which has been input by the person in charge of remittance, by the decryption key held in the certificate terminal 4, and verifies decrypted first recipient biometric information with the second recipient biometric information input on the above-described procedure D-4. When the biometric information match, the terminal notifies it to the recipient and the person in charge of remittance.

D-6 The person in charge of remittance hands over the money from the remitter to the recipient on receiving the verification-matched notification from the certificate terminal 4.

As described in the fourteenth example, the electronic commerce method of the present invention is used in remittance from the remitter to the recipient other than the money loan explained in the twelfth example and the thirteenth example. Conventionally, when the remitter remits cash to the recipient, account-to-account remittance where remittance is performed from a remitter's account to a recipient's account, or means where the remitter remits cash that he/she has by a registered mail for cash, have been generally used. However, by using the method of the above-described fourteenth example, remittance can be performed from the remitter's account directly to the recipient without going through the recipient's account. Thus, remittance can be performed even if the recipient does not have an account capable of account-to-account remittance.

Particularly in the fourteenth example, the method is applied for the case where the remitter and the recipient are in remote places as described above. Specifically, it is applied for the case where the remitter remits money to a shop (recipient) after he/she goes Internet shopping, or the case where he/she send money to a family member in a remote place, for example. In this case, the terminal owned by the recipient is used as the certificate terminal (1, 4) as described above. Further, the recipient goes to the teller window of the financial institution with the certificate terminal (1, 4) and may perform the above-described procedure C-4 to C-6 or D-4 to D-6 to receive money, or alternatively, the person in charge of remittance of the financial institution visits the recipient's home and may perform the above-described procedure C-4 to C-6 or D-4 to D-6 at his/her home to hand over money.

Meanwhile, by further applying the methods explained in the above-described eighth example to tenth example for the fourteenth example, the agent specified by the recipient can receive the money from the remitter on be half of the recipient. In addition, the methods explained in the above-described fourth example to seventh example may be further applied for the fourteenth example, and in this case, the operational effect similar to each of theabove-described fourth to seventh example can be obtained.

(1-15) Fifteenth Example of the Electronic Commerce Method of the Present Invention The fifteenth example (not shown) of the electronic commerce method of the present invention is a method where the remitter requests the financial institution not by the remitter's terminal as in the above-described fourteenth example but by the certificate terminal of the recipient via the network to perform remittance from the remitter's account to the recipient. Specifically, it is a method where the remitter and the recipient are in the same place, a terminal (terminal owned by the recipient) at a store counter of a shop or the like is used as the certificate terminal, and remittance is performed to the recipient who does not have an account in the above-described financial institution. In the fifteenth example, electronic commerce is basically performed in substantially the same procedure as the above-described first example to third example, as explained as the first to the third aspects below.

The first aspect of the fifteenth example is executed according to the same procedure as the above-described first example, and it is specifically executed by the following procedure E-1 to E-5.

E-1 The recipient inputs the certificate information for identifying the recipient himself/herself to the certificate terminal 1 owned by the recipient (refer to FIG. 1A, FIG. 1B).

E-2 The certificate terminal 1 encrypts the certificate information by a predetermined encryption key, sends encrypted certificate information and a remittance request to the financial institution via the network, and holds the certificate information and a decryption key for decrypting the encrypted certificate information.

E-3 When the recipient receives money from the remitter, the person in charge of remittance of the financial institution inputs the encrypted certificate information, which has been received from the certificate terminal 1, to the certificate terminal 1 and the recipient inputs data (principal certification key such as a password, for example) necessary for decrypting the encrypted certificate information to the certificate terminal 1.

E-4 The certificate terminal 1 verifies data input on the above-described procedure E-3 with the principal certification key previously held in the certificate terminal 1. When they match, the terminal decrypts the encrypted certificate information, which has been input by the person in charge of remittance, by the decryption key held in the certificate terminal 1, verifies decrypted certificate information with the certificate information held in the certificate terminal 1, and when the certificate information match, notifies it to the recipient and the person in charge of remittance.

E-5 The person in charge of remittance hands over the money from the remitter to the recipient on receiving verification-matched notification from the certificate terminal 1.

Further, the second aspect of the fifteenth example is executed by applying the same procedure as the above-described second example to the first aspect of the above-described fifteenth example. Specifically, in the second aspect, the certificate terminal 1 (refer to FIG. 3) holds the biometric information of the orderer together with the certificate information and the decryption key on the above-described procedure E-2, the recipient inputs his/her own biometric information to the certificate terminal 1 as data necessary for decrypting the encrypted certificate information on the above-described procedure E-3, and the certificate terminal 1 verifies the biometric information, which has been input by the recipient at the time of receiving money, with the biometric information previously held in the certificate terminal 1 and decrypts the encrypted certificate information by the decryption key held in the certificate terminal 1 when the biometric information match on the above-described procedure E-4.

Furthermore, the third aspect of the fifteenth example is executed according to the same procedure as the above-described third example, and it is specifically executed by the following procedure F-1 to F-5.

F-1 The recipient inputs the first recipient biometric information for identifying the recipient himself/herself to the certificate terminal 4 owned by the recipient (refer to FIG. 4A, FIG. 4B).

F-2 The certificate terminal 4 encrypts the first recipient biometric information by a predetermined encryption key, sends encrypted first recipient biometric information and a remittance request to the financial institution via the network, and holds a decryption key for decrypting the encrypted first recipient biometric information.

F-3 When the recipient receives money from the remitter, the person in charge of remittance of the financial institution inputs the encrypted first recipient biometric information, which has been received from the certificate terminal 4, to the certificate terminal 4 and the recipient inputs the second recipient biometric information for identifying the recipient himself/herself to the certificate terminal 4.

F-4 The certificate terminal 4 decrypts the encrypted first recipient biometric information, which has been input by the person in charge of remittance, by the decryption key held in the certificate terminal 4, verifies encrypted first recipient biometric information, which has been input by the person in charge of remittance, by the decryption key held in the certificate terminal 4, and verifies decrypted first recipient biometric information with the second recipient biometric information input on the above-described procedure F-3. When the biometric information match, the terminal notifies it to the recipient and the person in charge of remittance.

F-5 The person in charge of remittance hands over the money from the remitter to the recipient on receiving the verification-matched notification from the certificate terminal 4.

By using the method of the above-described fifteenth example, remittance can be performed from the remitter's account directly to the recipient without going through the recipient's account. Thus, remittance can be performed even if the recipient does not have an account capable of account-to-account remittance.

Particularly in the fifteenth example, the method is applied for the case where the remitter and the recipient are in the same place as described above. Specifically, it is applied for the case where the remitter buys a commodity at the store counter of a shop or the like. In this case, a shop manager or the like is a recipient and a shop terminal provided at the store counter is used as the certificate terminal (1, 4). Furthermore in the fifteenth example, the recipient goes to the teller window of the financial institution with the certificate terminal (1, 4) and may perform the above-described procedure E-3 to E-5 or F-3 to F-5 to receive money, or alternatively, the person in charge of remittance of the financial institution visits the recipient's home and may perform the above-described procedure E-3 to E-5 or F-3 to F-5 at his/her home to hand over money, similar to the fourteenth example.

Meanwhile, by further applying the methods explained in the above-described eighth example to tenth example for the fifteenth example, the agent specified by the recipient can receive the money from the remitter on be half of the recipient. In addition, the methods explained in the above-described fourth example to seventh example may be further applied for the fifteenth example, and in this case, the operational effect similar to each of theabove-described fourth to seventh example can be obtained.

(2) Electronic Commerce System and Certificate Terminal of the Present Invention Description will be made as follows for the constitution examples and the operation of the electronic commerce system and the certificate terminal of the present invention.

(2-1) First Constitution Example of the Electronic Commerce System and the Certificate Terminal FIG. 13 is the block diagram showing a first constitution example of the electronic commerce system and the certificate terminal of the present invention. The first constitution example shown in FIG. 13 is for realizing the first example and the fourth example of theabove-described electronic commerce method.

The electronic commerce system of the first constitution example is constituted by including a certificate terminal 1 of the orderer, which places an order for a commodity with an order receiver and performs certification to the orderer himself/herself at the time of receiving the commodity, a network 2 on which information is exchanged between the certificate terminal 1 and the order receiver, and a received order information holding section 3 of the order receiver, which holds received order information sent from the certificate terminal 1 via the network 2.

Then, the certificate terminal 1 in the first constitution example is constituted by including a data input section 14, a certificate information holding section 10, an encryption key creation section 21, an encrypting section 11, an output interface section 19, a decryption key holding section 12, a password holding section 13, an input interface section 20, a user certification section 15, a certificate information decryption section 16, a certificate information verification section 17, and a decryption key deletion section 22.

The data input section 14 serves as a function as a certificate information input section for inputting the certificate information (password, for example) for identifying the orderer himself/herself at the time when an order is placed for a commodity, and a function as a data input section which inputs the password (data necessary for decrypting encrypted certificate information) by the orderer at the time of commodity delivery.

The certificate information holding section 10 holds the certificate information input from the data input section 14.

The encryption key creation section (encryption key creation section) 21 creates a predetermined encryption key and a decryption key for decrypting information encrypted by the encryption key each time when the order is placed for the commodity.

The encrypting section 11 encrypts the certificate information, which has been input from the data input section 14, by the encryption key created by the encryption key creation section 21.

The output interface section (output I/F) 19 is for sending the encrypted certificate information, which has been encrypted by the encrypting section 11, as the received order information to the order receiver (received order holding section 3) via the network 2 together with the order form (information such as product name, quantity, amount, and delivery destination), and for notifying the verification result by the certificate information verification section 17 (described later) to the order receiver (received order holding section 3).

The decryption key holding section (decryption key holding section) 12 holds the decryption key for decrypting the encrypted certificate information, which has been created by the encryption key creation section 21, and the password holding section (data holding section) 13 holds the password (data necessary for permitting the decryption of the encrypted certificate information; data for certifying that he/she is the valid owner of the certificate terminal 1; principal certification key) in advance.

The input interface section (input I/F) 20 is for inputting the encrypted certificate information held in the received order information holding section 3, which is the slot for a medium such as Compact Flash® card, for example.

The user certification section (orderer certification section) 15 verifies the password previously held in the password holding section 13 with the password, which has been input from the data input section 14 by the orderer at the time of placing an order, and performs principal certification to the user of the certificate terminal 1. When the passwords match, the section permits the use of the decryption key held in the decryption key holding section 12.

The certificate information decryption section (decryption section) 16 decrypts the encrypted certificate information, which has been input from the input interface section 20, by using the decryption key held in the decryption key holding section 12 on receiving the verification result by the orderer certification section 15.

The certificate information verification section (verification section) 17 verifies the certificate information decrypted by the decryption section 16 with the certificate information held in the certificate information holding section 10, and notifies the verification result to the orderer, the person in charge of delivery, and the order receiver.

The encryption key deletion section (decryption key deletion section) 22 deletes the deleting key held in the deleting key holding section 12 on completing the verification (verification by the certificate information verification section 17) at the time of commodity delivery.

Herein, the certificate terminal 1 is a personal computer or the like, for example, and when a CPU or the like in the certificate terminal 1 executes predetermined electronic commerce program, functions as the above-described encryption key creation section 21, encrypting section 11, user certification section 15, certificate information decryption section 16, certificate information verification section 17, and decryption key deletion section 22 are realized. The above-described electronic commerce program is provided in a mode that it is stored in a computer-readable storage medium such as a flexible disc, a CD-ROM, a CD-R, a CD-RW, and a DVD, for example. In this case, the CPU uses it after reading out the electronic commerce program from the storage medium and transferring it to an internal storage device or an external storage device for storage. Further, the electronic commerce program is stored in a storage device (storage medium) such as a magnetic disc, an optical disc, and a magneto-optical disc, and the program may be provided for the CPU from the storage device via a communication line.

Moreover, as the storage medium in this embodiment, it is possible to use various kinds of computer-readable media such as an IC card, a ROM cartridge, a magnetic tape, a punch card, an internal storage device of computer (memory such as RAM and ROM), an external storage device, and a printed matter on which codes such as barcodes are printed, in addition to the above-described flexible disc, CD-ROM, CD-R, CD-RW, DVD, magnetic disc, optical disc, and magneto-optical disc.

Note that the data input section 14 is made up of a keyboard and a touch panel of the personal computer or the like, for example, and the certificate information holding section 10, the decryption key holding section 12, and the password holding section 13 are made up of a RAM of the personal computer or the like, for example.

In the first constitution example made up as described above, the password for performing certification to the owner (user) of the certificate terminal 1 is previously input to the password holding section 13 of the certificate terminal 1. The orderer inputs the certificate information from the data input section 14 to the certificate terminal 1 when placing an order. The certificate terminal 1 holds the input certificate information by the certificate information holding section 10, encrypts the certificate information by the encrypting section 11, outputs it from the output interface section 19, and transmits it to the received order information holding section 3 of the order receiver via the network 2. At this point, the order information (information such as product name, quantity, amount, and delivery destination) of the orderer is also transmitted in combination to the order receiver. The decryption key for decrypting the encrypted certificate information is held in the decryption key holding section 12 in the certificate terminal 1. Note that the encryption key is deleted when the encryption by the encrypting section 11 is completed.

At the time of orderer certification (at the time of commodity delivery), the order receiver (person in charge of delivery) transmits the encrypted certificate information held in the received order information holding section 3 to the certificate terminal 1 of the orderer, and it is input from the input interface section 20. At this point, the encrypted certificate information may be transmitted/input to the certificate terminal 1 via the network 2, or may be input by Flash Compact® card as described above, for example. Then, in the certificate terminal 1, the orderer inputs the password from the data input section 14, and whether or not the password in the password holding section 13 matches the input password is determined in the user certification section 15.

When the passwords match, the user certification section 15 outputs a decryption permission signal for permitting the decryption of the encrypted certificate information, which has been input, to the certificate information decryption section 16. The certificate information decryption section 16 decrypts the encrypted certificate information by using the decryption key in the decryption key holding section 12 on receiving the decryption permission signal. Then, the certificate information verification section 17 verifies the certificate information held in the certificate information holding section 10 with the certificate information decrypted by the certificate information decryption section 16, and confirms that the certificate information match. The certificate terminal 1 displays the certification result on an LED or a liquid crystal panel, and transmits it as digital data to the received order information holding section 3 of the order receiver via the output interface section 19 and the network 2.

Furthermore, in the first constitution example, the encryption key creation section 21 creates the encryption key and the decryption key each time when the orderer places an order at the certificate terminal 1. Then, at the point when the verification by the certificate information verification section 17 is completed, the decryption key deletion section 22 deletes the decryption key held in the decryption key holding section 12.

As described, according to the first constitution example shown in FIG. 13, the first example of the electronic commerce method, which has been explained referring to FIG. 1A, FIG. 1B, and FIG. 2, and the fourth example of the electronic commerce method, which has been explained referring to FIG. 6A, FIG. 6B, and FIG. 7, are realized, and the operational effect similar to the first example and the fourth example can be obtained.

(2-2) Second Constitution Example of the Electronic Commerce System and the Certificate Terminal FIG. 14 is the block diagram showing a second constitution example of the electronic commerce system and the certificate terminal of the present invention. The second constitution example shown in FIG. 14 is for realizing the second example and the fourth example of the above-described electronic commerce method. The second constitution example is also constituted substantially the same as the first constitution example shown in FIG. 13, but a biometric information holding section 13a is provided instead of the password holding section 13 and a biometric sensor 18 is newly provided, in the second constitution section. Note that reference numerals in FIG. 14 same as the reference numerals already described denote the same or substantially the same sections, and their explanation will be omitted.

The data input section 14 in the second constitution example serves only as a function as the certificate information input section that inputs the certificate information (password, for example) for identifying the orderer himself/herself at the time of placing an order for the commodity, and the biometric sensor 18 serves as a function as the data input section that takes and inputs the biometric information (data necessary for decrypting the encrypted certificate information) of the orderer at the time of commodity delivery.

Further, the biometric information holding section (data holding section) 13a previously hold the biometric information (data necessary for decrypting the encrypted certificate information; data for certification as being a terminal owner that he/she is the valid owner of the certificate terminal 1).

Then, in the second constitution example, the user certification section 15 verifies the biometric information, which is previously held in the biometric information holding section 13a, with the biometric information that has been input from the biometric sensor 18.

Although the user certification section 15 of the first constitution example performs principal certification to the user of the certificate terminal 1 by using the password, the user certification section 15 of the second constitution example performs principal certification (that is, biometric certification) to the user by using the biometric information. Herein, the biometric information refers to the physical features of a human (fingerprint, palm pattern, retina, iris, capillary blood vessel pattern, face image, voiceprint or the like) or particular action of a human (such as sign and gesture), which are transformed into data. Further, the biometric certification is a method that uses two biometric information (A, B) and certifies that the owner of the biometric information A and the owner of the biometric information B are the same. Note that the biometric information described in the present invention includes not only the example mentioned above, but also includes all data by which certification of human can be performed.

Furthermore, the encryption key creation section 21 creates the encryption key and the decryption key each time when the orderer places an order at the certificate terminal 1 similar to the first constitution example in the second constitution example as well. Then, the decryption key deletion section 22 deletes the deleting key held in the decryption key holding section 12 at the point where the verification by the certificate information verification section 17 is completed.

As described, according to the second constitution example shown in FIG. 14, the second example of the electronic commerce method, which has been explained referring to FIG. 3, and the fourth example of the electronic commerce method, which has been explained referring to FIG. 6A, FIG.

6B, and FIG. 7, are realized, and the operational effect similar to the second example and the fourth example can be obtained.

Figure 15:
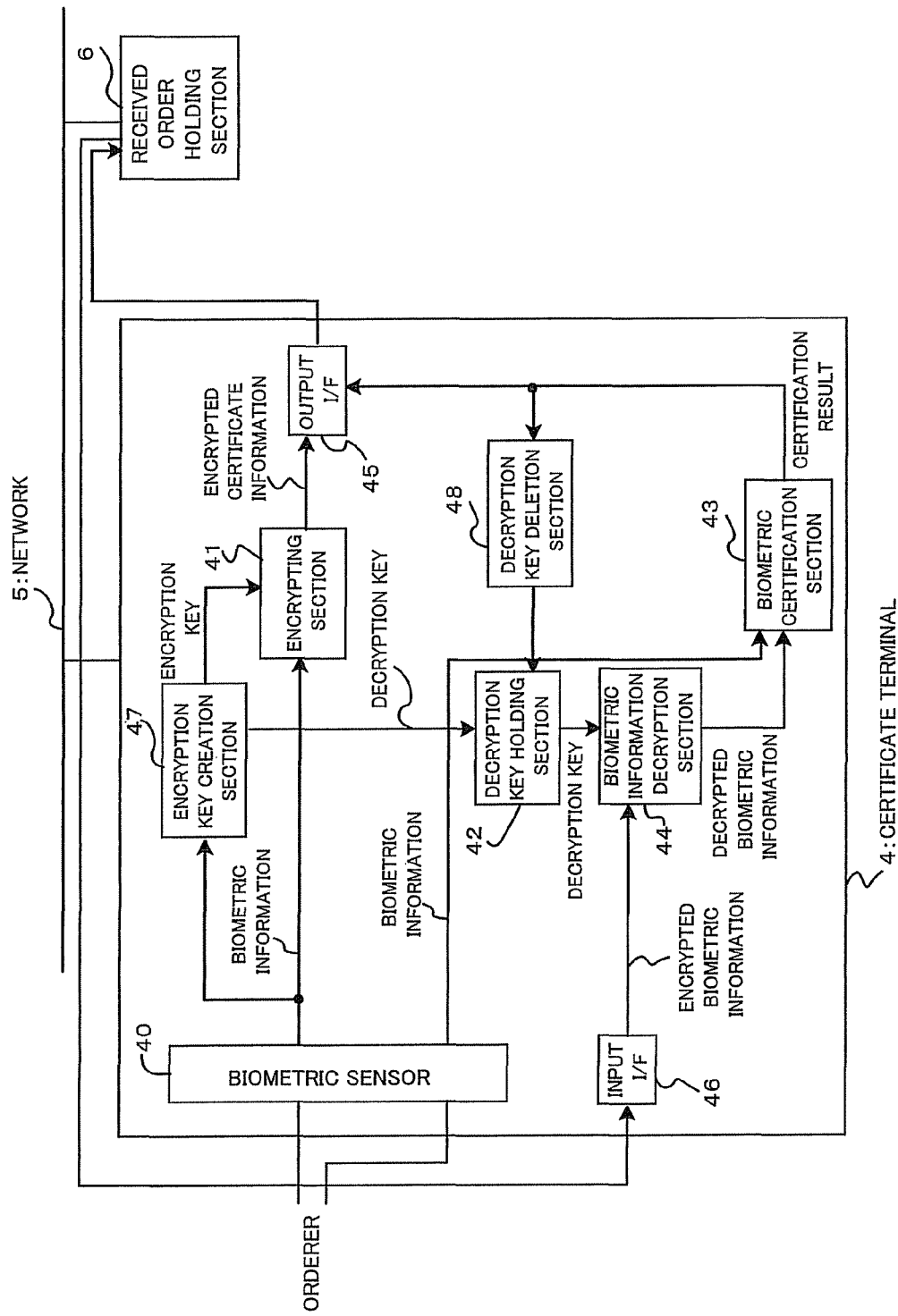
FIG. 15 is a block diagram showing a third constitution example of the electronic commerce system and the certificate terminal of the present invention.

(2-3) Third Constitution Example of the Electronic Commerce System and the Certificate Terminal FIG. 15 is the block diagram showing a third constitution example of the electronic commerce system and the certificate terminal of the present invention. The third constitution example shown in FIG. 15 is for realizing the third example and the fourth example of theabove-described electronic commerce method.

The electronic commerce system of the third constitution example is constituted by including the certificate terminal 4 of the orderer, which places an order for a commodity with the order receiver and performs certification to the orderer himself/herself at the time of receiving the commodity, a network 5 on which information is exchanged between the certificate terminal 4 and the order receiver, and a received order holding section 6 of the order receiver, which holds the received order information sent from the certificate terminal 4 via the network 5.

Then, the certificate terminal 4 of the third constitution example is constituted by including a biometric sensor 40, an encryption key creation section 47, an encrypting section 41, an output interface section 45, a decryption key holding section 42, an input interface section 46, a biometric information decryption section 44, a biometric certification section 43, and a decryption key deletion section 48. The biometric sensor (biometric information input section) 40 takes and inputs the biometric information of the orderer.

The encryption key creation section (encryption key creation section) 47 creates a predetermined encryption key and a decryption key for decrypting information encrypted by the encryption key each time when the order is placed for the commodity.

The encrypting section 41 encrypts the first orderer biometric information, which has been input by the orderer from the biometric sensor 40 at the time of placing an order for the commodity, by the encryption key created by the encryption key creation section 47.

The output interface section (output I/F) 45 is for sending the encrypted first orderer biometric information, which as been encrypted by the encrypting section 41, as the received order information to the order receiver (received order holding section 6) via the network 5 together with the order form (information such as product name, quantity, amount, and delivery destination), and for notifying the verification result by the biometric certification section 43 (described later) to the order receiver (received order holding section 6).

The decryption key holding section (decryption key holding section) 42 holds the decryption key for decrypting the encrypted first orderer biometric information, which has been created by the encryption key creation section 47.

The input interface section (input I/F) 46 is for inputting the encrypted first orderer biometric information held in the received order information holding section 6, which is the slot for a medium such as Compact Flash® card, for example.

The biometric information decryption section (decryption section) 44 decrypts the encrypted first orderer biometric information, which has been input from the input interface section 46, by using the decryption key held in the decryption key holding section 42.

The biometric certification section (verification section) 43 verifies the first orderer biometric information decrypted by the biometric information decryption section 44 with the second orderer biometric information, which has been input by the orderer from the biometric sensor 40 at the time of commodity delivery, and notifies the verification result to the orderer, the person in charge of delivery, and the order receiver.

The decryption key deletion section (decryption key deletion section) 48 deletes the deleting key held in the deleting key holding section 42 on completing the verification (verification by the biometric certification section 43) at the time of commodity delivery.

Herein, similar to the first constitution example, the certificate terminal 4 of the third constitution example is also the personal computer or the like, for example, and when the CPU or the like in the certificate terminal 4 executes predetermined electronic commerce program, functions as the above-described encryption key creation section 47, encrypting section 41, biometric information decryption section 44, biometric certification section 43, and decryption key deletion section 48 are realized. The above-described electronic commerce program is provided in a mode that it is stored in the computer-readable storage medium such as the flexible disc, CD-ROM, CD-R, CD-RW, and DVD, for example. Note that the decryption key holding section 42 is made up of the RAM of the personal computer or the like, for example.

In the certificate terminal 4 of the third constitution example made up as described above, the terminal obtains the first orderer biometric information of the orderer by the biometric sensor 40 at the time when the order is placed, encrypts it by the encrypting section 41, and transmits it to the received order information holding section 6. Note that the encryption key is deleted when the encryption by the encrypting section 41 is completed.

On the other hand, at the time of orderer certification (at the time of commodity delivery), the order receiver (person in charge of delivery) transmits the encrypted first orderer biometric information held in the received order information holding section 6 to the certificate terminal 4, and it is input from the input interface section 46. At this point, the encrypted first orderer biometric information may be transmitted/input to the certificate terminal 4 via the network 5, or may be input by Flash Compact® card as described above, for example.

Then, the certificate terminal 4 decrypts the encrypted first orderer biometric information by the biometric information decryption section 44, and transmits the decryption result to the biometric certification section 43. herein, the certificate terminal 4 takes the orderer's biometric information (second orderer biometric information) again. Then, the terminal inputs the second orderer biometric information to the biometric certification section 43, and the biometric certification section 43 verifies the two biometric information to perform principal certification to the orderer. The certificate terminal 4 displays the certification result on the LED or the liquid crystal panel, and transmits it as digital data to the received order information holding section 6 of the order receiver via the output interface section 45 and the network 5.

Furthermore, in the third constitution example, the encryption key creation section 47 creates the encryption key and the decryption key each time when the orderer places an order at the certificate terminal 4. Then, at the point when the certification by the biometric certification section 43 is completed, the decryption key deletion section 48 deletes the decryption key held in the decryption key holding section 42.

As described, according to the third constitution example shown in FIG. 15, the third example of the electronic commerce method, which has been explained referring to FIG. 4A, FIG. 4B, and FIG. 5, and the fourth example of the electronic commerce method, which has been explained referring to FIG. 6A, FIG. 6B, and FIG. 7, are realized, and the operational effect similar to the third example and the fourth example can be obtained.

Figure 16:
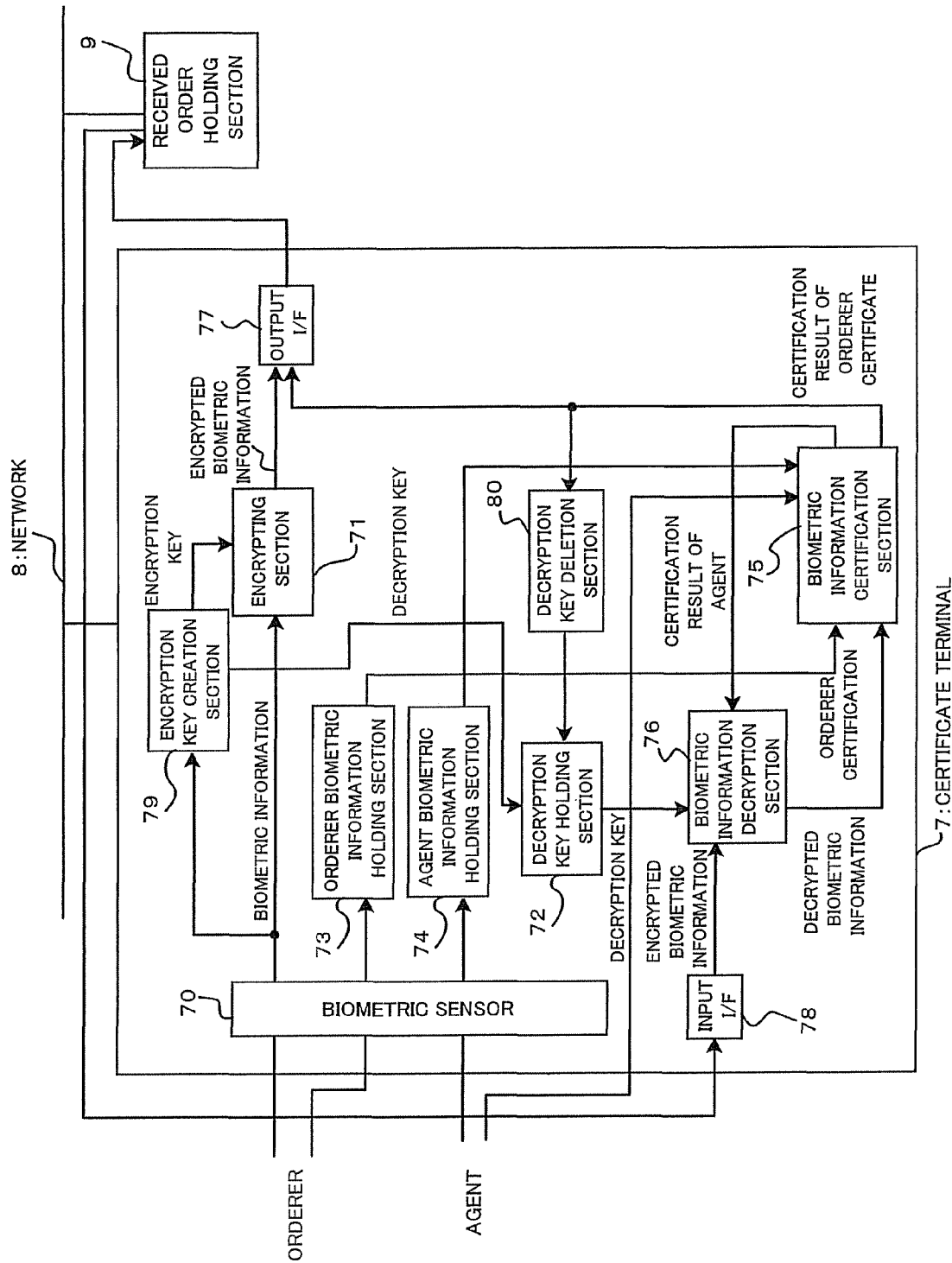
FIG. 16 is a block diagram showing a fourth constitution example of the electronic commerce system and the certificate terminal of the present invention.

(2-4) Fourth Constitution Example of the Electronic Commerce System and the Certificate Terminal FIG. 16 is the block diagram showing a fourth constitution example of the electronic commerce system and the certificate terminal of the present invention. The fourth constitution example shown in FIG. 16 is for realizing the ninth example and the fourth example of the above-described electronic commerce method.

The electronic commerce system of the fourth constitution example is constituted by including a certificate terminal 7 of the orderer, which places an order for a commodity with the order receiver and performs certification at the time when the agent entrusted by the orderer receives the commodity, a network 8 on which information is exchanged between the certificate terminal 7 and the order receiver, and a received order holding section 9 of the order receiver, which holds the received order information sent from the certificate terminal 7 via the network 8.

Then, the certificate terminal 7 of the fourth constitution example is constituted by including a biometric sensor 70, an encryption key creation section 79, an encrypting section 71, an output interface section 77, a decryption key holding section 72, a biometric information holding section 73, an agent biometric information holding section 74, an input interface section 78, a biometric information decryption section 76, a biometric certification section 75, and a decryption key deletion section 80.

The biometric sensor (biometric information input section) 70 takes and inputs the biometric information.

The encryption key creation section (encryption key creation section) 79 creates a predetermined encryption key and a decryption key for decrypting information encrypted by the encryption key each time when the order is placed for the commodity.

The encrypting section 71 encrypts the first orderer biometric information A, which has been input by the orderer from the biometric sensor 70 at the time of placing an order for the commodity, by the encryption key created by the encryption key creation section 79.

The output interface section (output I/F) 77 is for sending the encrypted first orderer biometric information A, which as been encrypted by the encrypting section 71, as the received order information to the order receiver (received order holding section 9) via the network 8 together with the order form (information such as product name, quantity, amount, and delivery destination), and for notifying the verification result by the biometric certification section 75 (described later) to the order receiver (received order holding section 9).

The decryption key holding section (decryption key holding section) 72 holds the decryption key for decrypting the encrypted first orderer biometric information A, which has been created by the encryption key creation section 79.

The biometric information holding section 73 holds the second orderer biometric information B, which has been input by the orderer from the biometric sensor 70, when the orderer entrusts the agent to receive the commodity, and the agent biometric information holding section 74 holds the first agent biometric information C, which has been input by the agent from the biometric sensor 70, when the orderer entrusts the agent to receive the commodity as well.

The input interface section (input I/F) 78 is for inputting the encrypted first orderer biometric information A, which is held in the received order information holding section 9, at the time of commodity delivery, and it is the slot for a medium such as the above-described Compact Flash® card, for example.

The biometric certification section 75 serves as a function as an agent certification section (agent certification function) and a function as an orderer certification section (orderer certification function) The agent certification function of the biometric certification section 75 is a function in which the first orderer biometric information C held in the agent biometric information holding section 74 is verified with the second agent biometric information D, which has been input by the agent from the biometric sensor 70 at the time of commodity delivery, and the use of the decryption key held in the decryption key holding section 72 is permitted when the agent biometric information (A, B) match.

The biometric information decryption section (decryption section) 76 decrypts the encrypted first orderer biometric information A, which has been input from the input interface section 78 by using the decryption key held in the decryption key holding section 72, on receiving the verification result by the agent certification function of the biometric certification section 75.

Further, the orderer certification function of the biometric certification section 75 is a function in which the first orderer biometric information A decrypted by the biometric information decryption section 76 is verified with the second orderer biometric information B, which has been held in by orderer biometric information holding section 73, and the verification result is notified to the orderer, the person in charge of delivery, and the order receiver.

The decryption key deletion section (decryption key deletion section) 80 deletes the deleting key held in the deleting key holding section 72 on completing the verification (orderer verification by the biometric certification section 75) at the time of commodity delivery.

Herein, similar to the first constitution example, the certificate terminal 7 of the fourth constitution example is also the personal computer or the like, for example, and when the CPU or the like in the certificate terminal 7 executes predetermined electronic commerce program, functions as the above-described encryption key creation section 79, encrypting section 71, biometric information decryption section 76, biometric certification section 75, and decryption key deletion section 80 are realized. The above-described electronic commerce program is provided in a mode that it is stored in the computer-readable storage medium such as the flexible disc, CD-ROM, CD-R, CD-RW, and DVD, for example. Note that the decryption key holding section 72, biometric information holding section 73, and the agent biometric information holding section 74 are made up of the RAM of the personal computer or the like, for example.

In the fourth constitution example made up as described above, principal certification to the orderer by the agent is realized. The certificate terminal 7 obtains the orderer's biometric information A by the biometric sensor 70 at the time when an order is placed, encrypts it by the encrypting section 71, and transmits it to the received order information holding section 9 of the order receiver. Note that the encryption key is deleted when the encryption by the encrypting section 71 is completed. Next, the orderer registers an agent, who performs principal certification to the orderer on his/her behalf, with the certificate terminal 7. The certificate terminal 7 obtains the biometric information (B, C) of the orderer and the agent, and holds them in the orderer biometric information holding section 73 and the agent biometric information holding section 74.

On the other hand, at the time of orderer certification (at the time of commodity delivery), the order receiver (person in charge of delivery) transmits the encrypted biometric information in the received order information holding section 9 to the certificate terminal 7, and it is input from the input interface section 78. At this point, the encrypted first orderer biometric information A may be transmitted/input to the certificate terminal 7 via the network 8, or may be input by Flash Compact® card as described above, for example.

Then, the agent allows the certificate terminal 7 to read the biometric information D of the agent. For example, in the case of verification using fingerprint, the agent presses his/her finger against a fingerprint sensor as the biometric sensor 70 attached to the certificate terminal 7 to allow the sensor to read the fingerprint, and a fingerprint image (biometric information) is obtained. The biometric certification section 75 verifies the biometric information D input at the time of certification with the biometric information C held in the agent biometric information holding section 74, and executes principal certification to the agent. The certification result is output to the biometric information decryption section 76. When the agent certification result is "OK", the biometric information decryption section 76 decrypts the encrypted biometric information A, which has been input from the input interface 78, by the decryption key held in the decryption key holding section 72. After that, the biometric certification section 75 verifies decrypted biometric information A with the biometric information B held in the orderer biometric information holding section 73, and executes principal certification to the orderer. The certificate terminal 7 displays the certification result on the LED or the liquid crystal panel, and transmits it as digital data to the received order holding section 9 of the order receiver via the output interface 77 and the network 8.

Furthermore, in the fourth constitution example, the encryption key creation section 79 creates the encryption key and the decryption key each time when the orderer places an order at the certificate terminal 7. Then, at the point when the certification by the biometric certification section 75 is completed, the decryption key deletion section 80 deletes the decryption key held in the decryption key holding section 72.

As described, according to the fourth constitution example shown in FIG. 16, the ninth example of the electronic commerce method, which has been explained referring to FIG. 12A to FIG. 12C, and the fourth example of the electronic commerce method, which has been explained referring to FIG. 6A, FIG. 6B, and FIG. 7, are realized, and the operational effect similar to the ninth example and the fourth example can be obtained.

(3) Effects of the Present Invention

According to the embodiments of the above-described present invention, the certificate information and the biometric information of an orderer/recipient are encrypted and passed to an orderer receiver/financial institution at the time when an order is placed, and the encrypted information is decrypted only in the certificate terminal (1, 4, 7) of the orderer/recipient. When the orderer/recipient receives a commodity or money, a person in charge of delivery/person in charge of remittance or the orderer/recipient inputs predetermined information including the above-described encrypted information to the certificate terminal (1, 4, 7), the above-described encrypted information is decrypted in the certificate terminal (1, 4, 7), and principal certification to the orderer/recipient is performed. Therefore, abuse of the certificate information such as the password and the biometric information, which are exchanged on the network (2, 5, 8) when electronic commerce is performed, can be prevented without fail.

Further, according to the embodiments of the present invention, the certificate terminal (7, 7A) is allowed to hold the biometric information C of an agent and the biometric information B of the orderer in advance, the person in charge of delivery (dealer) inputs the biometric information A of the orderer, which has been sent from the certificate terminal (7, 7A) at the time of commodity delivery (at the time of principal certification to the orderer being a certified person) and the agent inputs his/her own biometric information D to the certificate terminal (7, 7A). When principal certification to the agent is performed first and it is certified that the agent is the agent himself/herself in the certificate terminal (7, 7A), principal certification to the orderer (certified person) is performed by the biometric information A of the orderer, which has been input by the person in charge of delivery, and the biometric information B of the orderer, which is previously held in the certificate terminal (7, 7A). Consequently, in receiving the commodity or the like, not only the orderer himself/herself but also the agent specified by the orderer himself/herself can receive it while the security is ensured, and convenience significantly improves.

As described, according to the embodiments of the present invention, the use of PKI (key management, executing encryption) can be simplified and misappropriation of biometric information or impersonating action by unauthorized order is prevented without fail regarding the orderer/recipient (user), and electronic commerce using the Internet or the like can be performed without fear. Further, principal certification to the orderer by the agent is made possible, and convenience significantly improves.

Further, regarding the order receiver/financial institution (dealer), unauthorized order can be detected and practice of the unauthorized order can be prevented without fail, and thus illegal fraud of commodity by unauthorized transaction can be prevented without fail.

Moreover, regarding the settlement institution, unauthorized settlement can be detected, and practice of settlement, which is not intended by the orderer (user) user, can be prevented without fail.

(4) Others

Note that the present invention is not limited to the above-described embodiments, and it can be executed in various modifications within a scope without departing from the gist of the present invention.

For example, the above-described embodiments explain that the information (such as biometric information and decryption key) stored in the certificate terminal (1, 4, 7) is only one pair, but the present invention is not limited to this and plural pairs of information used in plural numbers of order may be stored corresponding to each order. In this case, index information is added to a part of information that has been transmitted to the order receiver, for example, and a constitution is made such that the index information is received and it is determined which information in a memory is used to perform certification.

INDUSTRIAL APPLICABILITY

As described above, according to the present invention, the certificate information and the biometric information of an orderer/recipient are encrypted and passed to an orderer receiver/financial institution at the time when an order is placed. When the orderer/recipient receives a commodity or money, a person in charge of delivery/person in charge of remittance or the orderer/recipient inputs predetermined information including the above-described encrypted information to a certificate terminal, the above-described encrypted information is decrypted in the certificate terminal, and principal certification to the orderer/recipient is performed. With this method, abuse of a password and biometric information, which are exchanged on a network when electronic commerce is performed, can be prevented without fail.

Consequently, the present invention is preferably used in electronic commerce performed by using a network such as the Internet, and its usefulness is considered to be quite high.

What is claimed is:

1. A terminal that is connected to a received order holding section as an order receiver via a network, places an order for a commodity, and certifies, upon reception of the commodity, an orderer and an agent entrusted by the orderer, the terminal comprising:
  biometric information input means for inputting biometric information, the biometric information input means including:
    means for inputting a first orderer biometric information for identifying the orderer upon the placing the order for the commodity,
    means for inputting a second orderer biometric information for identifying the orderer and a first agent biometric information for identifying the agent when the orderer entrusts the agent with the reception of the commodity, and
    means for inputting a second agent biometric information for identifying the agent upon delivery of the commodity;
  output interface means for sending the first orderer biometric information together with an order form of the commodity to the received order holding section via the network;
  biometric information holding means for holding the second orderer biometric information by relating the second orderer biometric information to the first agent biometric information;
  agent biometric information holding means for holding the first agent biometric information by relating the first agent biometric information to the second orderer biometric information;
  input interface means for inputting the first orderer biometric information held in the received order holding section upon delivery of the commodity;
  biometric certification means for certifying, upon reception of the commodity, an orderer and an agent, the biometric certification means including:
    means for verifying the first agent biometric information held in the agent biometric information holding means with the second agent biometric information inputted by the biometric information input means,
    means for verifying, when the first agent biometric information and the second agent biometric information match, the first orderer biometric information inputted by the input interface means with the second orderer biometric information held in the biometric information holding means being related to the first agent biometric information, and
    means for notifying, when the first orderer biometric information and the second orderer biometric information match, the agent and a person in charge of delivery of the commodity of the match;
  encrypting means for encrypting the first orderer biometric information inputted by the biometric information input means when placing the order for the commodity; and
  decryption key holding means for holding a decryption key for decrypting the encrypted first orderer biometric information encrypted by the encrypting means, wherein
  the output interface means is configured to send the first orderer biometric information encrypted by the encrypting means to the received order holding section,
  the input interface means is configured to input the encrypted first orderer biometric information held in the received order holding section, and
  the terminal further comprises:
    a decryption means for decrypting the encrypted first orderer biometric information inputted by the input interface means, when the first agent biometric information and the second agent biometric information match as a result of comparison by the biometric certification means, using the decryption key retained in the decryption key holding means;
    encryption key creation means for generating the encryption key and the decryption key for decrypting encrypted information encrypted with the encryption key every time an order is placed for the commodity; and
    decryption key deletion means for deleting the decryption key held in the decryption key holding means once the comparison by the biometric certification means is completed upon the delivery of the commodity.

2. The terminal according to claim 1, wherein the biometric certification means determines that the comparison is unmatched when the first orderer biometric information is identical to the second orderer biometric information.

3. A computer-readable medium having an electronic commerce program recorded thereon, the electronic commerce program, upon being executed on a terminal that is connected to received order holding section as an order receiver via a network, makes a computer embody a function to certify, upon reception of a commodity, an orderer and an agent entrusted by the orderer, the electronic commerce program being executed by the computer to make the computer to function as:
  biometric information input means for inputting biometric information, the biometric information input means including:
    means for inputting a first orderer biometric information for identifying the orderer upon the placing the order for the commodity,
    means for inputting a second orderer biometric information for identifying the orderer and a first agent biometric information for identifying the agent when the orderer entrusts the agent with the reception of the commodity, and
    means for inputting a second agent biometric information for identifying the agent upon delivery of the commodity;
  output interface means for sending the first orderer biometric information together with an order form of the commodity to the received order holding section via the network;
  biometric information holding means for holding the second orderer biometric information by relating the second orderer biometric information to the first agent biometric information;
  agent biometric information holding means for holding the first agent biometric information by relating the first agent biometric information to the second orderer biometric information;

input interface means for inputting the first orderer biometric information held in the received order holding section upon delivery of the commodity;

biometric certification means for certifying, upon reception of the commodity, an orderer and an agent, the biometric certification means including:

means for verifying the first agent biometric information held in the agent biometric information holding means with the second agent biometric information inputted by the biometric information input means, means for verifying, when the first orderer biometric information and the second orderer biometric information match, the first orderer biometric information inputted by the input interface means with the second orderer biometric information held in the biometric information holding means, and means for notifying, when the first orderer biometric information and the second orderer biometric information match, the agent and a person in charge of delivery of the commodity of the match;

encrypting means for encrypting the first orderer biometric information inputted by the biometric information input means when placing the order for the commodity;

decryption means for decrypting the encrypted first orderer biometric information inputted by the input interface means, when the first agent biometric information and the second agent biometric information match as a result of comparison by the biometric certification means, using a decryption key held in a decryption key holding means;

encryption key creation means for generating the encryption key and the decryption key for decrypting encrypted information encrypted with the encryption key every time an order is placed for the commodity; and decryption key deletion means for deleting the decryption key retained in the decryption key holding means once the comparison by the biometric certification means is completed upon the delivery of the commodity.

4. The computer readable storage medium according to claim 3 having an electronic commerce program recorded thereon, the program being further executed by the computer to make the computer to function such that the biometric certification means determines that the comparison is unmatched when the first orderer biometric information is identical to the second orderer biometric information.

\* \* \* \* \*